United States Patent
Poff et al.

(10) Patent No.: US 6,330,659 B1
(45) Date of Patent: *Dec. 11, 2001

(54) HARDWARE ACCELERATOR FOR AN OBJECT-ORIENTED PROGRAMMING LANGUAGE

(75) Inventors: Thomas C. Poff, Los Altos; John Shigeto Minami, San Jose; Ryo Koyama, Palo Alto, all of CA (US)

(73) Assignee: iReady Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,540

(22) Filed: Nov. 6, 1997

(51) Int. Cl.[7] .............................. G06F 15/00; G06F 15/76
(52) U.S. Cl. ................................. 712/34; 712/36
(58) Field of Search .................................. 707/103, 516; 345/340; 364/490; 709/315, 316; 712/34, 35, 36, 221–224

(56) References Cited

U.S. PATENT DOCUMENTS

| | | | |
|---|---|---|---|
| 4,807,111 | * | 2/1989 | Cohen et al. ........................ 364/200 |
| 4,839,851 | * | 6/1989 | Maki .................................... 364/900 |
| 5,455,599 | * | 10/1995 | Cabral et al. ........................ 345/133 |
| 5,544,357 | * | 8/1996 | Huei ....................................... 707/2 |
| 5,581,686 | * | 12/1996 | Koppolu et al. ..................... 395/340 |
| 5,596,702 | * | 1/1997 | Stucka et al. ........................ 395/340 |
| 5,621,434 | * | 4/1997 | Marsh .................................. 345/145 |
| 5,650,941 | * | 7/1997 | Coelho et al. .................... 364/514 R |
| 5,664,162 | * | 9/1997 | Dye ...................................... 345/521 |
| 5,680,605 | * | 10/1997 | Torres ................................... 395/603 |
| 5,734,852 | * | 3/1998 | Zias et al. ............................ 395/334 |
| 5,754,556 | * | 5/1998 | Ramseyer et al. .................. 371/10.3 |
| 5,778,178 | * | 7/1998 | Arunachalam .................. 395/200.33 |
| 5,854,750 | * | 12/1998 | Phillips et al. ................... 364/478.04 |
| 5,870,622 | * | 2/1999 | Gulick et al. .......................... 712/35 |
| 5,877,764 | * | 3/1999 | Feitelson et al. .................... 345/347 |
| 5,918,051 | * | 6/1999 | Savitzky et al. ..................... 709/303 |
| 5,923,892 | * | 7/1999 | Levy ...................................... 712/31 |
| 5,946,487 | * | 8/1999 | Dangelo .............................. 395/705 |
| 5,966,534 | | 10/1999 | Cooke et al. ........................ 395/705 |
| 5,968,161 | | 10/1999 | Southgate .............................. 712/37 |
| 6,078,736 | | 6/2000 | Guccione ........................ 395/500.17 |

OTHER PUBLICATIONS

Agrawal et al "Architecture and Design of teh MARS Hardware Accelerator", ACM 1987, pp. 101–107.*
Case, "Implementing the Java Virtual Machine", Microprocessor Report, Mar. 1996.*
Wayner, "Sun Gambles on Java Chips", Byte, Nov. 1996.*
Raz, "Real Time Program Language Accelerator", WO 98/21655, May 1998.*

* cited by examiner

Primary Examiner—Thomas Black
Assistant Examiner—Uyen Le
(74) Attorney, Agent, or Firm—Michael A. Glenn

(57) ABSTRACT

A method and apparatus for accelerating an object-oriented programming language are provided at a hardware gate level. In a Java-compliant embodiment, a Java Application framework is implemented in hardware. The Java.AWT, Java.NET, and Java.IO application frameworks are supported in the preferred embodiment of the invention. Application framework classes are stored as libraries in a shared memory. Instances and methods of supported application framework classes that are executed by a Java program are offloaded to a hardware object management system. A software stub is provided as an interface between the hardware object management system and the central processing unit. Central processing unit processing of non-supported application framework instructions is continued during hardware accelerator execution of hardware object management system requests.

26 Claims, 20 Drawing Sheets

Object List After Object Instantiations and Deletion

| Object# | Memory Block | InUse Flag | Object Type | Obj Link | |
|---|---|---|---|---|---|
| 1 | 30 byte block | In Use | Frame | | |
| 2 | 30 byte block | In Use | GridLayout | | |
| 3 | 30 byte block | In Use | Container | 4 | |
| 4 | 30 byte block | In Use | Component | 6 | |
| 5 | 30 byte block | Free | n/a | | |
| 6 | 30 byte block | In Use | Component | 0 | |
| ... | | | | | |
| n | 30 byte block | Free | | | |

See FIG. 10A

| Components supported by the Rendering Engine | | | |
|---|---|---|---|
| Button | Choice | List | TextArea |
| Canvas | Dialog | Menu | Textfield |
| Checkbox | Label | ScrollBar | |

*FIG. 13*

HARDWARE ACCELERATOR FOR AN OBJECT-ORIENTED PROGRAMMING LANGUAGE

BACKGROUND OF THE INVENTION

1. Technical Field

The invention relates to object-oriented programming languages. More particularly, the invention relates to a hardware accelerator for an object-oriented programming language.

2. Description of the Prior Art

Object-oriented programming (OOP) is the name of a class of programming languages and techniques based on the concept of an "object". An object is a self-contained component which has a specific role in a program. OOP languages include C++, and the Java language, developed by Sun Microsystems, Inc. For the purposes of discussion only, the OOP language described herein is Java.

An OOP defines classes of objects. A "class" is a prototype for an object, or a set of objects which share a common structure and behavior. An object, also referred to as an "instance", is a specific representation of a class. Each instance of a class is distinguished by its particular attributes. These attributes are defined by "instance variables". The types and names of these instance variables are defined in the class. However, the values of the instance variables are set and changed in the object.

The behavior of a class determines how an instance of that class operates. The behavior of a class is determined by a set of routines, referred to as "methods", that is associated with the class. An operation on an object is performed using a method. Methods are common to all instances of a particular class.

Classes are hierarchically arranged. Each class in the hierarchy may have a class above it in the hierarchy, referred to as a "superclass", or a class below it, referred to as a "subclass". Subclasses "inherit" attributes and behavior from their superclasses. Thus, a subclass does not have to redefine a behavior that is defined in a superclass, but can inherit the methods and variables from the superclass.

In an OOP, procedure calls are described in terms of message passing. A message names a method and may optionally include other arguments. When a message is sent to an object, the object's class is searched for the method named therein to determine how to perform the requested operation on the given object. If the method is not defined for the object's class, the object's superclass is searched. This procedure is continued up through the class hierarchy until either the method definition is found or there is no higher superclass to search.

The arrangement of arguments for a procedure call is determined by a calling convention. The calling convention determines the particular order in which arguments are pushed onto a stack or entered in registers, as well as who is responsible for removing the arguments.

The calling conventions, or interface, by which an application accesses an operating system and other services is referred to as the Application Programming Interface (API). In Java, the core Java API defines the minimal set of functionality that must be supported for a platform to be considered Java compliant.

Java Supports independent programs, referred to as applications, and dependent programs, referred to as applets. Java applets are programs that are transmitted over an electronic network and executed by an application provided on a receiving device. Examples of such electronic networks include the Internet, and a local area network system, referred to herein as an intranet. Receiving devices include computers, personal data assistants, and Internet-capable telephones.

For purposes of discussion herein, a Java applet will be assumed to be transmitted over the Internet to a receiving computer for display in a World Wide Web (Web) page. A Java application is a standalone program that does not need to be executed by an application, such as a Web browser provided on the receiving computer.

Java is a platform-independent language that can run on any Java compliant computer system. The Java development environment includes a Java compiler and a Java interpreter. The Java compiler generates bytecodes from a Java program. Java bytecodes are machine instructions that are not platform-specific.

A platform-specific bytecode interpreter is used to execute the Java program. This bytecode interpreter is called the Java virtual machine. For applets, the bytecode interpreter is built into a Java-enabled Web browser. The Java virtual machine and its supporting code are together referred to as the Java runtime system.

The Java virtual machine includes a bytecode instruction set, a set of registers, an area for storing methods, a stack, and a garbage-collected heap. The Java virtual machine registers temporarily hold the data representing the machine's state. The registers affect the machine's operation, and are updated after each bytecode is executed. The method area stores the Java bytecodes that implement most of the methods in the Java system.

The stack is used to supply parameters to both bytecodes and methods, and to receive back their results. The stack frame contains the local variables for the method call, its execution environment, and its operand stack.

The heap is the memory location from which newly-created instances are allocated. Instances are automatically "garbage-collected" in Java. A garbage collector is a programming function that is designed to track each instance that is created and to free the memory storing an instance after the last reference to the instance has vanished.

In Java, objects/classes that are intended to be reused repeatedly in different programs are stored as a "class library". A set of classes that embodies an abstract design for solutions to a number of related problems is known as a framework. The core application frameworks that are stored in the Java class library include Java.Lang, Java.Util, Java.Applet, Java.IO, Java.NET, and Java.AWT.

Java.Lang includes classes that add data types and system capabilities to the language itself, while Java.Util contains the utility classes and simple collection classes. Java.Applet contains classes for implementing Java applets.

Java.IO contains the input and output classes for writing to and reading from streams, such as standard input and output. Java.IO also includes the input and output classes for handling files.

Java.NET contains classes for networking support. Such classes include those for connecting and retrieving files in accordance with such standard Web protocols as, for example, TCP/IP and IP, and for creating sockets such as those used in UNIX applications.

The Java Abstract Windowing Toolkit (Java.AWT) provides classes and behavior for creating graphical user interface (GUI)—based applets and applications. The Java.AWT can be used, for example, to draw to the screen, create windows, buttons, menu bars, slider bars, and other user interface elements. Java.AWT can also be used to manage user input such as mouse clicks and keystrokes.

Object-oriented software frameworks are generally implemented using the computer's Random Access Memory (RAM), Read Only Memory (ROM), or Virtual Memory (VM). When a Java application or applet is started on, for example, a computer, one of the first operations performed is the creation of the GUI.

However, because a software-based implementation is being used, a significant percentage of the processing capacity of the computer operating system can be required to actually generate and display the GUI. Therefore, the processing of other instructions by the operating system can be slowed dramatically while GUI elements are being rendered on a display device. Further, if mouse or keyboard events are generated while a display is updating, the Java runtime may enter a kind of deadlock, where update events are being generated at the same time the system is trying to process backlogged mouse and keyboard events. Eventually the runtime system cannot catch up and process all events within a reasonable time frame. To an end-user the program appears to stop working, apparently refusing further commands and input.

Java is a multiprocess/multithreaded system. Thus, it supports a plurality of programs, or processes, executing simultaneously, each within its own address space. A thread is a sequence of code executing within one of these processes. Therefore, the Java programming environment and runtime system both have a multithreaded architecture.

In a multithreaded program such as Java, a single thread running a Java program may be blocked until, for example, a window is drawn. Additionally, any other thread that is dependant on that single thread can also be blocked. Blocking can restrict or delay, for example, information transmitted over a network. Blocking as such is defined as the capability for a Java thread to wait for a task to complete before resuming execution.

It is often desirable to run Java programs as a part of an embedded environment, for example to run Java applications and applets on a device such as an Internet-capable telephone. However, Java code and a fast Java bytecode processor are required to render the device Java compliant. This can significantly increase the costs of manufacturing and operating the device.

It would therefore be an advantage to provide a method and apparatus for reducing performance degradation. It would be yet another advantage if such method and apparatus permitted the efficient use of object-oriented programs in both embedded and desktop environments.

SUMMARY OF THE INVENTION

The invention provides a method and apparatus for accelerating an object-oriented programming language. The preferred embodiment of the invention is configured for use with a Java compliant processor with the Java programming language and standard Java object-based frameworks. However, alternative embodiments of the invention are adapted for use with any object oriented programming language. Alternative embodiments of the invention are also adapted for use with other object-based frameworks, such as Apple Computer's "Open Step" framework or Microsoft's object-based AFC library.

The invention provides a hardware accelerator that contains functionality to implement one or more Java application frameworks. In the presently preferred embodiment of the invention, the accelerator is constructed as part of an application specific integrated circuit (ASIC). The accelerator includes a hardware object management system that manages instances as well as the states of values assigned to the instances.

The preferred embodiment of the invention implements the Java Abstract Windowing Toolkit (AWT), Java.NET, and Java Input/Output application frameworks. Additional Java frameworks can also be supported by the invention, if required.

The Java runtime system manages both the hardware object management system and a software object management system. The software object management system can be implemented entirely in software, or in both software and hardware.

Instances and methods of supported Java application framework classes that are executed by a Java program are offloaded to the hardware object management system. Thus, in the preferred embodiment of the invention, the central processing unit (CPU) can continue processing instructions while the hardware object management system manages Java.AWT and Java.NET requests.

The invention stores application framework classes as libraries in a shared memory. However, each supported application framework is managed separately. A request is distributed to the hardware controller for the particular application framework, and the shared memory is accessed as necessary.

A software stub is provided as an interface between the hardware object management system and the CPU. The software stub can be modified or replaced to permit the invention to be used with any compatible OOP language.

The hardware object management system includes an Input/Output request queue for receiving and storing object requests. When a task processor allocates memory for an object, it is removed from the queue. An active object list tracks the number of reference counts in the Java virtual machine to an instance. When the number of reference counts to an instance is zero, the memory storing the object is deallocated by a Java garbage collector.

In the presently preferred embodiment of the invention, the Java.AWT hardware implementation contains a windowing/view system and a rendering engine. A graphic Java program is structured as a hierarchy of nested containers and components. Containers manage collections of visual objects called components. Components represent visual functionality that is displayed on the screen, such as menu bars, buttons, editable text areas and text fields.

Containers themselves may be hierarchically nested within one another and may maintain a parent <-> child relationship with another Container. For a given application, there is one container view at the top of the view hierarchy that is represented by a Window (AWT.Frame) object. AWT.Frame defines a window native to a particular platform (i.e. Windows™ or Solaris™).

In addition containers can also be thought of as special-case components that have the ability to contain other components that have the ability to contain other components. This is because functionally the Container class is a subclass of Component. A Panel is a Container that can be displayed ion a screen within an application or applet. A Frame is a Window (with a title and menu bar) and is yet another type of Component/Container object. The shared class behavior that all of these classes have allow them to share various characteristics and integrate well together. The Java.AWT hardware implementation leverages these shared functionalities between different component object variations by optimizing messaging and increasing container display efficiency.

Containers are Java.AWT components that can contain other components, including other containers. A panel is a container that can be displayed on screen, such as a applet. A frame is a window that has such features as a title, and a menu bar.

The windowing/view system includes a general graphics controller for creating frames and components and for passing data to the rendering engine, a window manager for managing the frames, a layout manager for managing container hierarchies within a frame, and a component manager for managing component hierarchies within a container.

The Java.NET hardware implementation contains a windowing/view system and a connectivity engine. The windowing/view system includes a network controller that contains microcode for Java.NET framework equivalencies. A network query mechanism performs DNS lookups and reports results to the network controller, a socket manager manages sockets in use by applications, and a stream manager for shuttles input and output data through a link supported by network protocols.

The invention therefore provides a hardware implementation for reducing blocking by co-processing instructions of a supported application framework. Java processing is thereby accelerated.

BRIEF DESCRIPTION OF THE DRAWINGS

FIG. 13 is a table showing components supported by a rendering engine according to the invention;

DETAILED DESCRIPTION OF THE INVENTION

The invention provides a method and apparatus for accelerating an object-oriented programming language. The preferred embodiment of the invention is optimized for use with the Java programming language developed by Sun Microsystems, Inc, and with the Java Application Program Interface. However, the invention is readily adapted for use with any object-oriented programming language, such as $C^{++}$ or even C for a program that was written in Object-Oriented Style. Thus, the following discussion is provided for purposes of example and not as a limitation on the scope of the invention.

Similarly, an implementation which is interconnected with the Java accelerator may employ a different application framework or set of application frameworks unconnected with Sun's Java APIS.

While the preferred embodiment of the invention is adapted for use in data transmission over the Internet, the invention is equally applicable to other wide area or local area networks. Additionally, while the preferred embodiment is used with a desktop computer, the invention can also be used with other devices, including network servers, personal data assistants, fax machines, and Internet-capable telephones.

The display screens and configuration of the graphical user interface described below are provided in accordance with the presently preferred embodiment of the invention. However, one skilled in the art will appreciate that such display screens and graphical user interfaces are readily modified to meet the requirements of alternative embodiments of the invention. The following discussion is therefore provided for purposes of example and not as a limitation on the scope of the invention.

Figure 1:
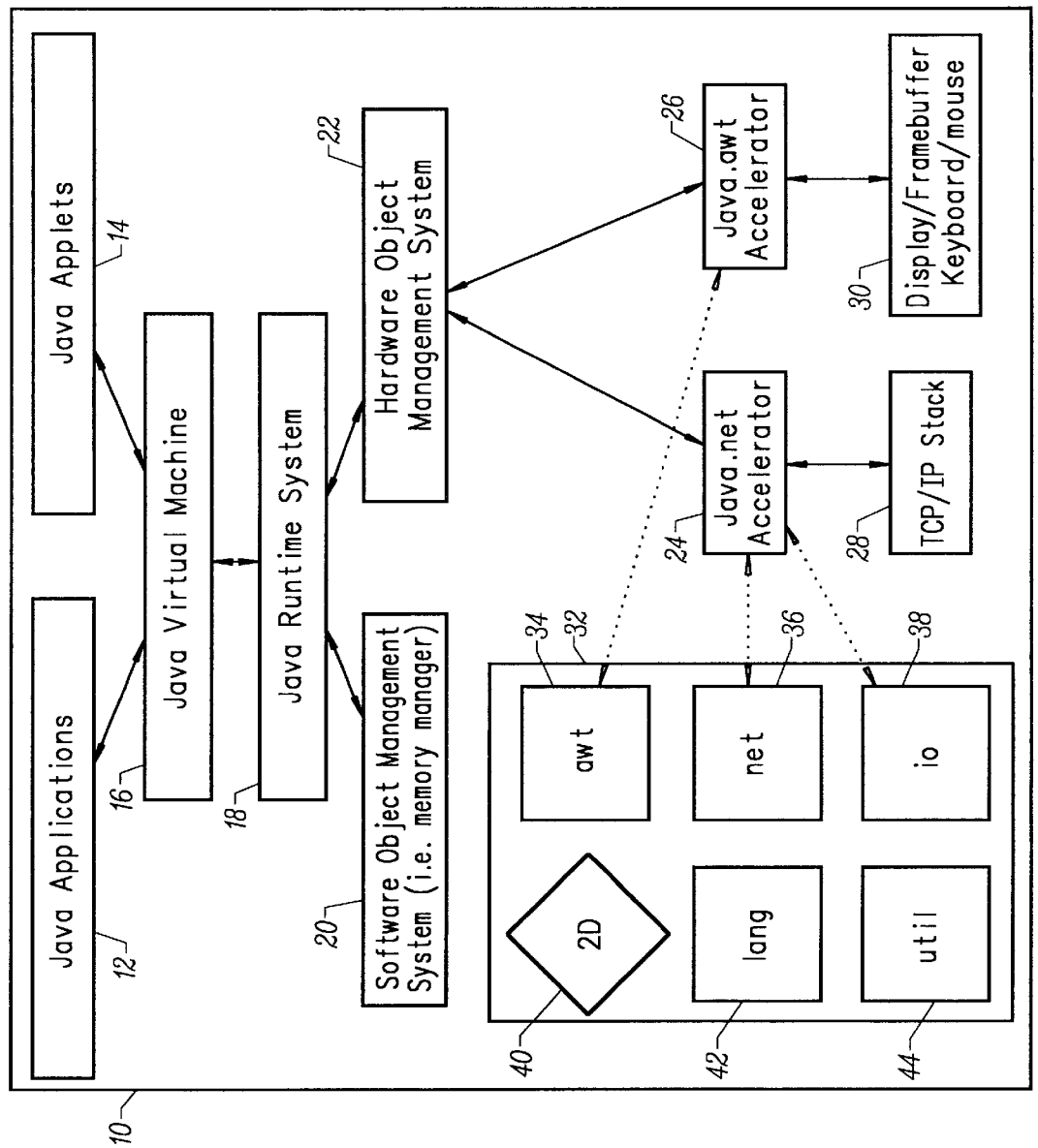
FIG. 1 is a block diagram showing a structural overview of a hardware accelerator 10 according to the invention.

FIG. 1 is a block diagram showing a structural overview of a hardware accelerator 10, according to the invention. The Java virtual machine 16 running on the computer's CPU (not shown) is the bytecode interpreter for Java applications 12 run on the computer system. For Java applets 14, the bytecode interpreter is built into a Java-enabled Web browser.

Hardware Object Management

A part of the Java-Accelerator's memory 400 (see FIG. 2) is predesignated to hold object descriptors and parameters. These object spaces are all of equal size, but the format of each depends on the type of object assigned to them. At the start of each object descriptor there is a status byte that indicates whether that particular object space is in use.

Upon initialization designators are indicated as being free. Software can then begin to create objects using the following steps:

First commands or tasks are issued to either the AWT command register 407 or the NET command register 413.

The commands are then decoded in either the AWT command decoder 408 or the NET command decoder 414.

Once the type of object that needs to be created is determined, the next available object ID is obtained from the Free Object Locator 403 and passed back along with any other status information through the return FIFOs 405 or 412, and back out to the system's processor via either the AWT Data register 406 or the NET Data register 410.

Once the Free Object Locator passes its object ID back to the system, it goes out and begins polling the available memory 400 for the next free object space.

When it finds one, it stores that object space's ID in anticipation of the next object creation command.

In the event that the Free Object Locator cycles through all of memory without finding an available object space, an out of memory status will be returned to the system.

When the system wishes to access a particular object that has already been created, it passes the task, along with that object's ID to either the AWT command register 407 or the NET command register 413. The object ID and tasks are parsed and decoded, and the ID passed to the Object ID Resolver 402. This block then translates the object ID into a memory address that can be used to access a particular object space in the memory block 400.

As the system receives requests for object deletion, the proper command, along with the object's ID is passed to the command registers. The task and ID are decoded and parsed, and the ID passed along to the object resolver. The Java accelerator then goes and clears the in use status bit in that particular object space in memory, thus making it available for the Free Object Locator for the next object creation command. In the case where the Free Object Locator previously had reported an out of memory status, the newly freed object's ID is stored directly in the Free Object locator, thus eliminating the need for the locator to cycle through memory to find the location.

The Free Object locator has the ability to store the next "n" free object IDs. This is used in instances where the size of each individual object space is small, and some objects then make use of "n" object spaces linked together. In this case, the first object space contains a link field which indicates where the continued object descriptor is stored. This continues in each successive object space until the "n–1" space, which contains a link to the "nth" object space. Under this architecture, the Free Object Locator reports back the ID of the starting object space in response to an object creation command. Also, if the type of object to be created is determined to need multiple object spaces, then the Free Object locator only reports back a starting ID if enough free object spaces are available. Otherwise an out of memory status is returned. Object spaces in this case do not have to be in sequential order and may be randomly linked. The Free Object Locator should be able to store "n" free object IDs where "n" is the maximum number of object spaces needed for the largest object to be created.

The object IDs provided by the hardware can be any number of bits in length.

The hardware object manager also works in the situation where object IDs are provided by the host system, and not returned by the hardware. In this case, the first provided object ID is stored in a base reference register, and associated with the first free object location. Each subsequent object request has its ID compared with the reference register. The offset determines the actual object location in memory. If that particular record is already in use, then the next free object location is used. A predefined reference field is included with each object record to indicate what offset it is associated. Offsets are performed in a modulo fashion such that memory locations wrap around to the beginning again when the offset is greater than the allotted memory space. This system also works for situations where the system provided object ID is a greater number of bits than the hardware object ID.

Figures 3, 4:
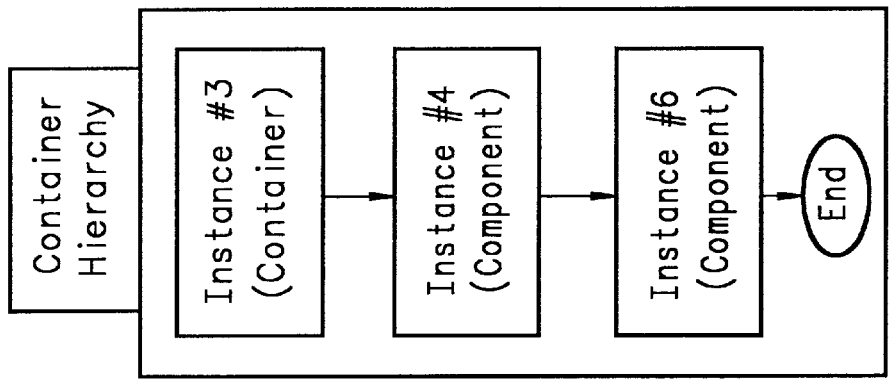
FIG. 3 is a table showing an object list after object instantiations and deletions according to the invention.
FIG. 4 is a block diagram showing a container's linked list to its internal component instances according to the invention.

FIG. 3 demonstrates what the heap looks like after several objects have been instaniated and deleted. Note the deleted object #5 which is currently free for reuse. Note that the Container object essentially heads a linked list of components. The list ends when the object value is 0. For this reason there is no object #0 and any references to it are invalid.

Other types of objects may exhibit this same functionality. A Button Object for instance likely references a string object which may in itself be more than 30 bytes. In this case a Button Object would point to a String Object which would in turn point to another String Object with each object measuring 30 bytes in length. This shows how Combined Object Entry Lists function.

FIG. 4 explicitly shows the Container's linked list to it's internal Component instances. The same list is indirectly shown in FIG. 4.

Objects on the Active Object List

Figure 5:
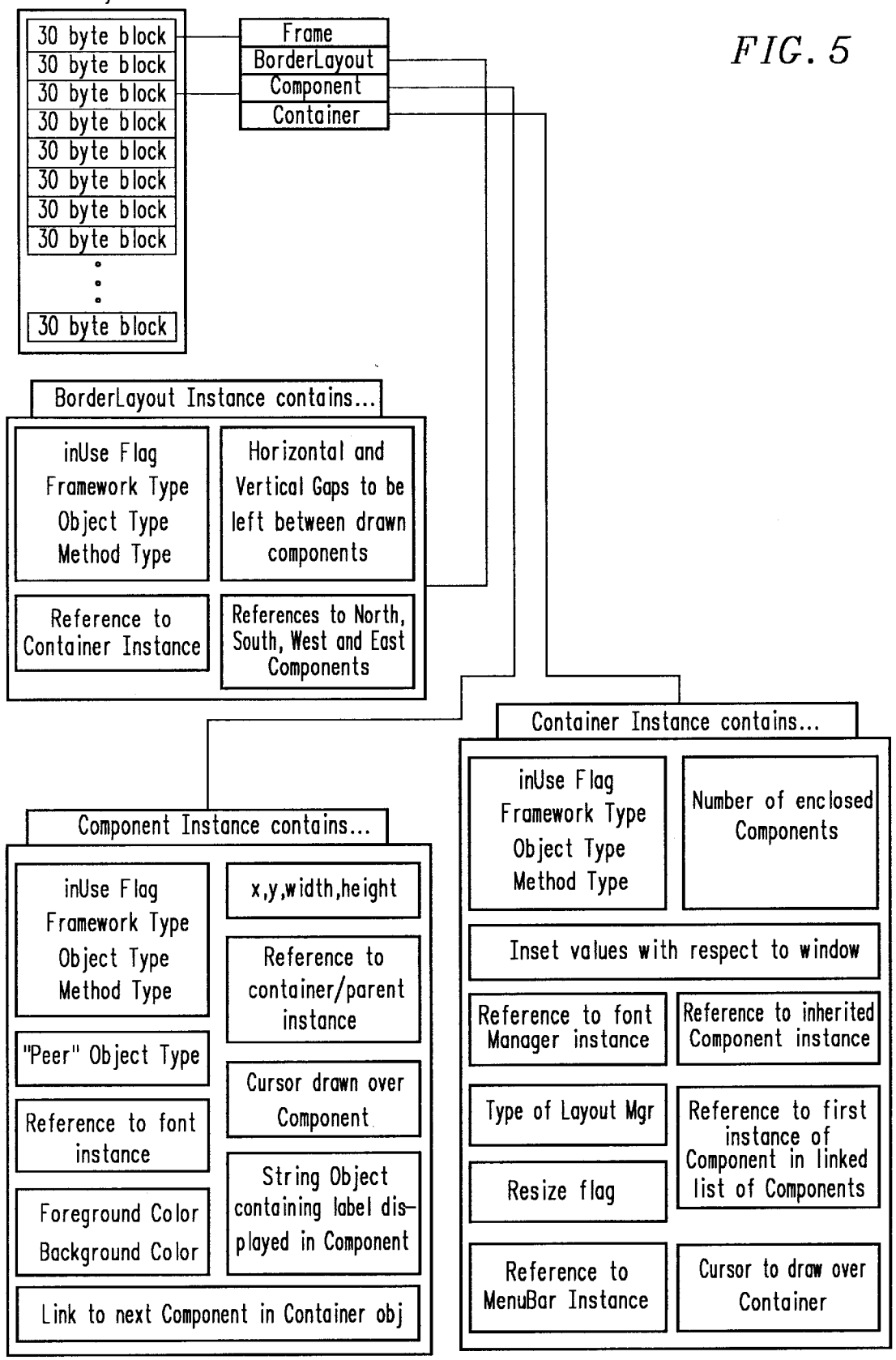
FIG. 5 is a block diagram showing an active object list according to the invention.

FIG. 5 is a block diagram showing an active object list according to the invention. The Active Object List contains a list of possibly many 30 byte blocks, each denoting an active instance of a particular type of object. Each type of object has a structure associated with it. All instantiated objects contain flags which describe the type of object, the method selector for the runtime system, and the framework the object belongs to. BorderLayout instances in addition contain a pointer to the container that uses them to lay out a set of components, possible object references to its components in the north, south, east and west, and a value determining the space to leave (in pixels) between components when drawings them. Container objects contain the number of enclosed components, a reference to a component object which holds the Container's inherited instance values and a reference to the first container object in a linked list of Component objects. Component objects contain a "type" value denoting if they should draw a button or handle events from a button, slider, textfield or other type of widget. They also contain a link to the next component available in the Container.

Objects (see FIG. 5) are handled in small blocks with the invention. The objects always look the same in terms of their size and footprint. What distinguishes one instance from another on the active object list is its data structure or instance variables.

Instances may be either simple or complex. They may contain 8, 16, 32 bit integers or single bit boolean values. They may also contain object reference IDs to other objects.

Take the case of a Container object. After a request for a Container object has been placed on the Input/Output Request Queue, JExpress takes the request and creates a fixed size block of memory to store variables related to the Container instance. After several Component objects are created, they may be added to the Container. If a Layout-Manager is assigned to manage objects assigned to a Container, this is done accordingly. In the case of a Container <-> BorderLayout association, five possible components may be added directly to the Container. The Borderlayout object is then given references to a maximum of five (north, south, east, west and center) components so that it knows how to draw and update these objects at later points in time.

The Active Object List contains a list of possibly many 30 byte blocks, each denoting an active instance of a particular type of object.

Each type of object has a structure associated with it as shown in the three object instance diagrams below.

All instantiated objects contain flags which describe the type of object, the a method selector for the runtime system, and the framework the object belongs to BorderLayout instances in addition contain a pointer to the container that uses them to layout a set of components, possible object references to it's components in the north, south, eat and west and a value determining the space to leave (in pixels) between components when drawing them.

Container objects contain the number of enclosed components, a reference to a component object which holds the Container's inherited instance values and a reference to the first container object in a linked list of Component objects.

Component objects contain a 'type' value denoting if they should draw a button or handle events from a button, slider, textfield or other type of widget. They also contain a link to the next component available in the Container.

These object definitions map directly into C structures which are managed by the framework (note these are preliminary structs that will both change and will be optimized).

```
typedef struct ir__descriptor__// first three bytes of object.
{   jbyte frameworkType;__// specify type of framework (Java.AWT,
       NET, IFC, etc)
    jbyte objectType;__// specify type of object (Frame, Event,
       Container, etc)
    jbyte methodType;__// specify object method ( -paint(), etc)
    jbyte inUse;____// find out if record is in use.
} desc;
typedef struct ir__container__// note: every container must reference a
component structure
{   desc__objDesc;
    jshort__ncomponents;__// number of components existing in
       container.
    Rect__insets;
    _____// LayoutsManagers can be one of the five defaults.
    jbyte__layoutType;____// denote type of layout used for this container.
    jint__layoutObj;____// specify index of instance of layout.
    _jint__inheritedCompObj;__// we are a subclass of component
so we need this
    _____// index to a component structure.
///////////////////////////// Frame-object depending variables.
    _jboolean__isResizable;__// used with Frame object.
    _jbyte__cursorType;____// cursors 0–13 used with Frame object.
    _unsigned short menuBarObj;__// Menu bars are often attached to Frame
objects.
/////////////////////////////
    int firstComponentNode;
} Container, Dialog, Frame, Window; // multiple names assigned for
convenience's sake.
    _____// A Window=Frame=Dialog=Container as far as
    _____// JExpress is concerned.
typedef struct ir__component
{   desc objDesc;
    jbyte peerObjType;____// this is the true object value of the
       component.
```

```
    // e.g. Button, Label, Textfield, etc.
_unsigned short x;
_unsigned short y;
_unsigned short width;
_unsigned short height;
_unsigned short parentObj;__// index to container object.
_unsigned short fontObj;__// index to object describing font in use by this
component.
_unsigned short foregroundColorObj;__// index to foreground color object.
_unsigned short backgroundColorObj;__// index to background color
object.
_unsigned short cursorObj;____// index to cursor object.
_unsigned short stringObj;____// reference to object containing string to
    _____// be rendered somehow in the component.(may be 0).
_jboolean visible;
_jboolean enabled;
_jboolean valid;
//    Dimension minSize;__// contains minimum allowed size of a
       Component.
//    Dimension prefSize;__// contains preferred size of Component.
_jint nextComponentNode;__// index to next known component in
container.
}  Canvas, Component;____// A Canvas is just a Component with a
paint() method.
typedef struct ir__borderlayout
{   desc objDesc;
    jshort hgap;
    jshort vgap;
    jshort container;__// index in array of the container we're associated
       with.
    jshort northComponent;__// index in array of components to point at.
    jshort southComponent;
    jshort westComponent;
    jshort eastComponent;
    jshort centerComponent;
} BorderLayout;
typedef struct ir__flowlayout
{   desc objDesc;
    jshort hgap;
    jshort vgap;
    jshort align;
} FlowLayout;
typedef struct ir__gridlayout
{   desc objDesc;
    unsigned short hgap;
    unsigned short vgap;
    unsigned short rows;
    unsigned short cols;
} GridLayout;
typedef struct ir__wgraphics
{   desc objDesc;
    unsigned short x, y;
    unsigned short width, height;
    unsigned short foregroundColorObj;__// index to foreground color
       object.
    unsigned short xoffset, yoffset;
    Rect clipRect;____// set by WGraphics:changeClip()
} WGraphics;
```

Miscellaneous Concepts

The object definitions outlined herein (along with others not defined herein) are used to create instances and maintain unique instance values. Without use of these data structures, the 30 byte blocks in the Active Object List would have no meaning. These object structs are used to identify, set, and access values within particular object instances. The runtime system uses the collection of object instances to make method execution meaningful for a given set of data.

A method descriptor in the descriptor struct for an object may be specified so that the object may be transmitted to the low-level framebuffer implementation. The smart framebuffer can then take the struct and interpret a command (such as a resize or redraw) in a meaningful way. At this time Graphics and Component objects have their structs forwarded to the smart framebuffer.

The Java runtime system 18 includes the Java virtual machine together with its supporting code. The Java runtime system parses instantiation and method calls. In the preferred embodiment of the invention, the Java runtime system manages two instance managers, a hardware object management system 22 and a software object management system 20. However, in alternative embodiments of the invention, the Java runtime system manages more than two instance managers.

The hardware object management system contains functionality to support Java application frameworks. In the presently preferred embodiment of the invention, the hardware object management system implements the Java Abstract Windowing Toolkit (AWT) 26, and Java.NET 24 application frameworks. The Java Input/Output application framework (not shown) is also implemented to support the Java.NET functions. The hardware object management system can readily be adapted to support additional Java frameworks, as needed. The invention therefore provides a Java application framework hardware implementation that functions as an accelerator for the CPU.

The hardware object management system manages instances as well as the states of values assigned to the instances. In the presently preferred embodiment of the invention, the hardware object management system is wholly implemented in gates, and can have associated external random access memory (RAM).

In this embodiment, the hardware object management system is constructed as part of an applications specific integrated circuit (ASIC). It should be appreciated that, while the preferred embodiment of the invention is discussed in connection with a gate-level implementation and with an ASIC, the actual hardware implementation of the invention is considered to be a matter of choice to one skilled in the art.

The software object management system can be implemented entirely in software. However, in alternative embodiments of the invention, the software object management system is implemented using both software and hardware components. An example of a software object management system is the computer system's memory manager.

Instances and methods of supported Java application framework classes that are executed by a Java program are offloaded to the hardware object management system. Thus, in the preferred embodiment of the invention, the CPU can continue processing instructions while the hardware object management system manages Java.AWT and Java.NET requests.

Whenever instances and methods in the hardware-implemented Java application framework classes are being executed by a Java program, the instances and methods are offloaded to the hardware object management system. Thus, in the preferred embodiment of the invention, the hardware object management system manages the Java.AWT and Java.NET requests of threads running on the Java virtual machine. The CPU is thereby available to continue processing instructions and threads that are not dependant upon the offloaded instances and methods while the hardware object management system manages the Java.AWT and Java.NET requests.

Application framework classes intended to be repeatedly reused in different programs are stored in the Java Class Library 32 (FIG. 1). Such classes can include those of the Java.AWT 34, Java.NET 36, Java.Lang 42, Java.IO 38, and Java.Util 44 application frameworks.

The application framework classes are stored as libraries in a shared memory. However, each supported application framework is managed separately. A request is distributed to the hardware controller for the particular application framework, and the shared memory is accessed as necessary.

Classes and behavior for performing network operations, such as establishing a socket connection, are implemented by the Java.NET accelerator 24. The Java.NET accelerator is provided with an interface to a network TCP/IP stack 28. The Java.NET accelerator includes a hardware implementation of both Java.NET 36 networking objects and Java.IO 38 input/output-related objects. This is because networking necessarily implies the input and output of data. The incorporation of both frameworks into hardware allows significant reduction of redundant software coding.

In one example of an implementation of the Java.NET accelerator, the Java.IO hardware implementation is used to handle data input and output during a socket connection. In the Java.NET accelerator, Java.NET and Java.IO application framework classes are bound together through inheritance. Thus, classes in one framework can inherit functionality in another framework, and then add to it.

The Java.AWT accelerator implements the classes, methods (i.e. behavior) of the Abstract Windowing Toolkit. The Java Abstract Windowing Toolkit (Java.AWT) provides classes and behavior for creating graphical user interface (GUI)—based applets and applications. Such classes include the Java.AWT class 32, and any associated rendering tools, for example, a two-dimensional rendering engine 40.

The Java.AWT accelerator can be used to draw to the screen, create windows, buttons, menu bars, slider bars, and other user interface elements, and can also be used to manage such user input as mouse clicks and keystrokes. Thus, the Java.AWT accelerator is provided with an interface to such devices 30 as the computer display, framebuffer, keyboard, and mouse.

Structural Overview

Figure 6:
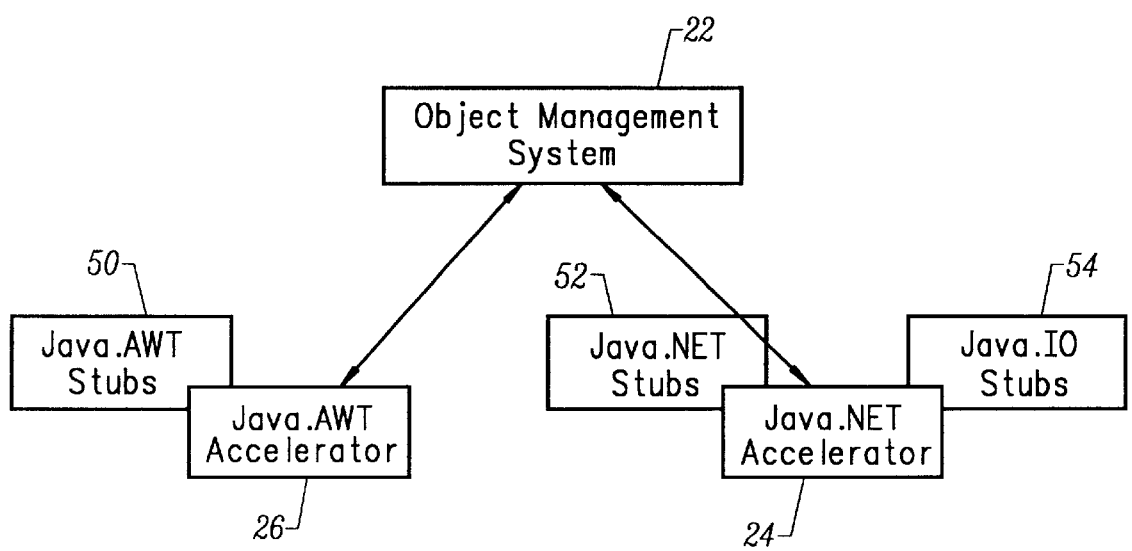
FIG. 6 is a block diagram of the internal functions of the hardware accelerator according to the invention.
Figure 7:
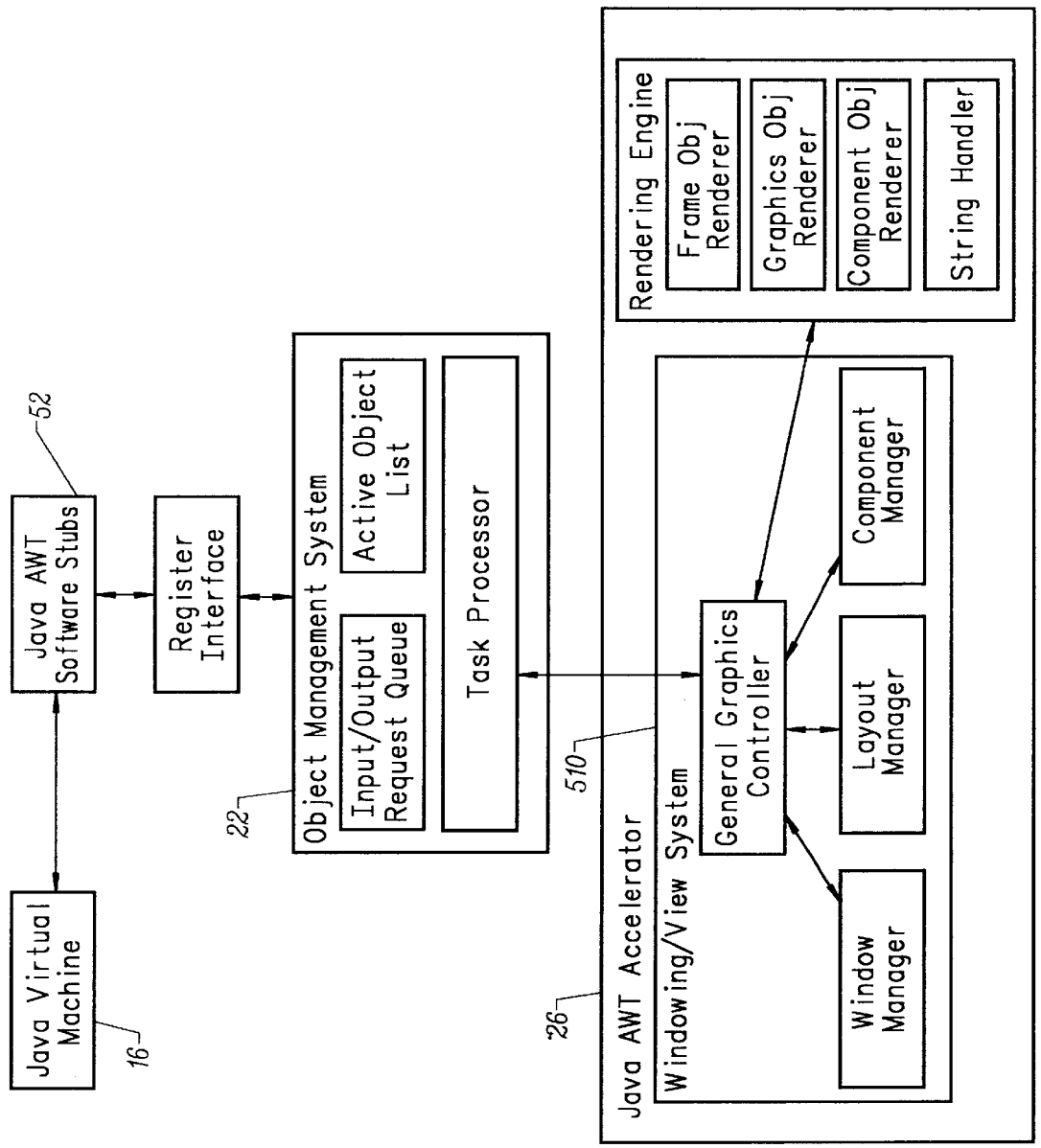
FIG. 7 is a more detailed block diagram of the Java AWT Accelerator shown on FIG. 6.

FIGS. 6 and 7 are block diagrams of a structural overview of the invention. The supported application frameworks, such as Java.AWT 26 (shown in greater detail in FIG. 7), Java.NET 24, and Java.IO (not shown) are cast into an ASIC to form accelerators. For the purposes of the following discussion, the Java.NET accelerator will be assumed to include input/output related objects of the Java.IO.

In the preferred embodiment of the invention, the hardware object management system 22 is also cast into the ASIC to manage instances and the states of values assigned to the instances. For example, the hardware object management system stores data to track whether a button is pushed. The hardware object management system also stores data indicating the relationship among objects, such as that the button is a part of a particular window. This information is stored in the shared memory.

Software stubs are provided as an interface between each accelerator and the CPU running the Java virtual machine. Thus, the Java.NET accelerator has associated Java.NET software stubs 52 and Java.IO software stubs 54, while the Java.AWT accelerator has associated Java.AWT software stubs 50. The software stubs covering the hardware components of the invention can be modified or replaced to permit the invention to be used with any compatible OOP language.

Figure 2:
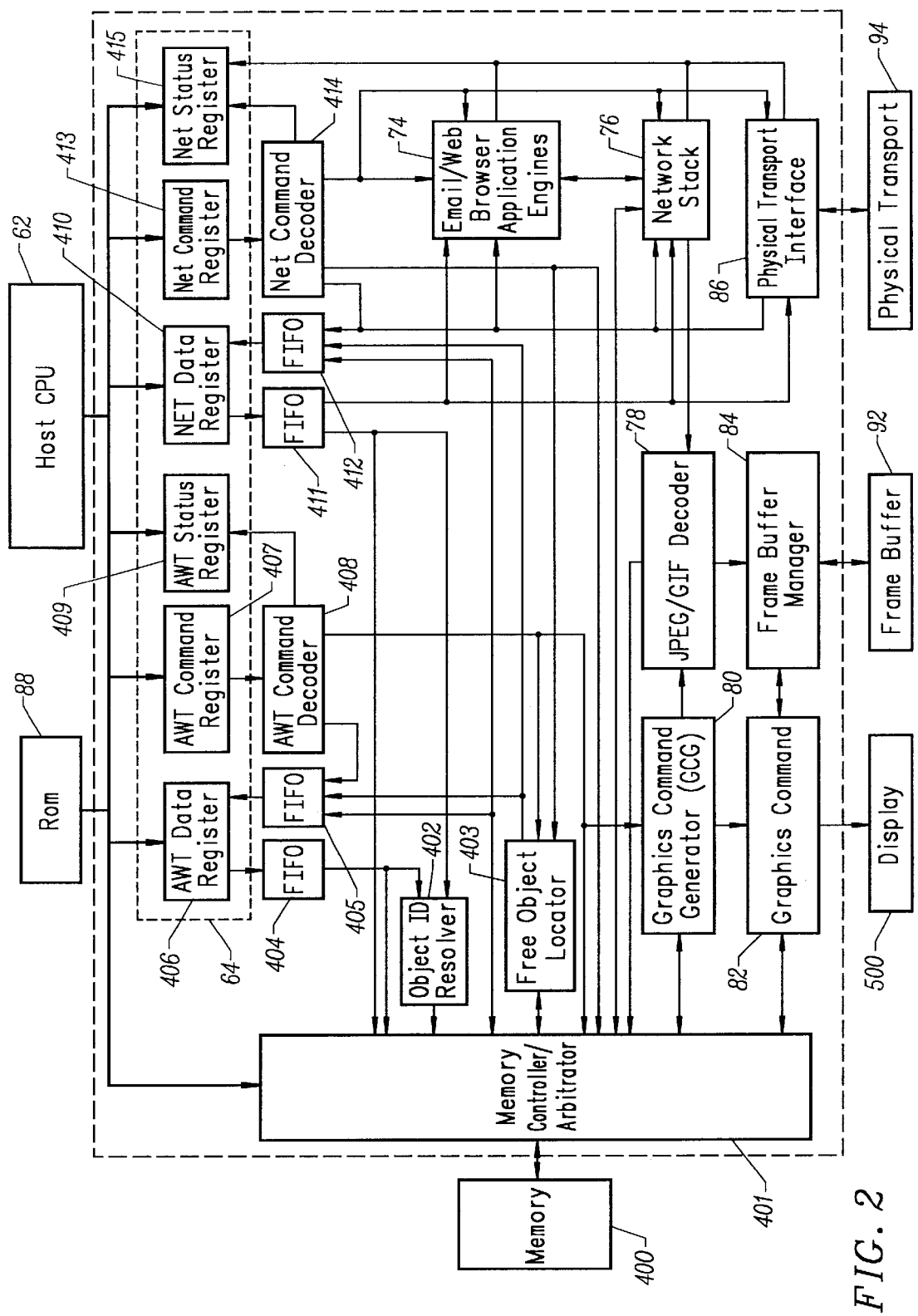
FIG. 2 is a block schematic diagram of a Java Accelerator according to the invention.

FIG. 2 (discussed above) is a block diagram of the internal functions of the hardware accelerator 60, according to the invention. A register interface 64 (406, 407, 409, 410, 413, 415) is provided to supervise and synchronize all input and output transfers between the host CPU 62 and the invention.

The Java compliant host CPU runs a Java virtual machine, for example, from read-only memory (ROM) storage 88. A Java applet or application that is transmitted to the invention through the physical transport 94 is then directed through the physical transport interface 86 to the host CPU. AWT command decoders 408 and NET command decoder 414 are used to convert the binary input information to output elements represented by the binary code.

The applet or application is stored in the memory 400 as bytecodes. A GUI must be created to display the applet or application. Thus, when a Java program is initially run from the memory, a call is made to the function libraries, stored in ROM, directing that a GUI display be generated.

Such call is directed, by means of the hardware object management system 402, 403 and the software stub, to the appropriate Java application framework accelerator. When, for example, a Java.AWT window is requested, the Java.AWT accelerator creates a window object. The graphics command generator 80 is then requested to direct the graphics controller 82 to actually draw the window on the display 500.

The Java.NET accelerator can include e-mail and web browser application engines 74. Thus, for example, a JPEG or GIF image can be downloaded from the Internet using the invention. The image is then directed through the Network TCP/IP stack 76 to a JPEG/GIF decoder 78 and then to a frame buffer 92, managed by a frame buffer manager 84. Thus, the invention uses a hardware implementation to accelerate the display of a graphical image downloaded from a network connection.

The memory controller/arbitrator 401 serves as an interface between the host CPU and the shared main memory 400. The memory controller/arbitrator allocates and manages system memory among the various components of the invention. This memory management includes the allocation of memory to, for example, the Java.AWT accelerator, or providing the CPU with the memory location of an object created by the invention.

Figure 8:
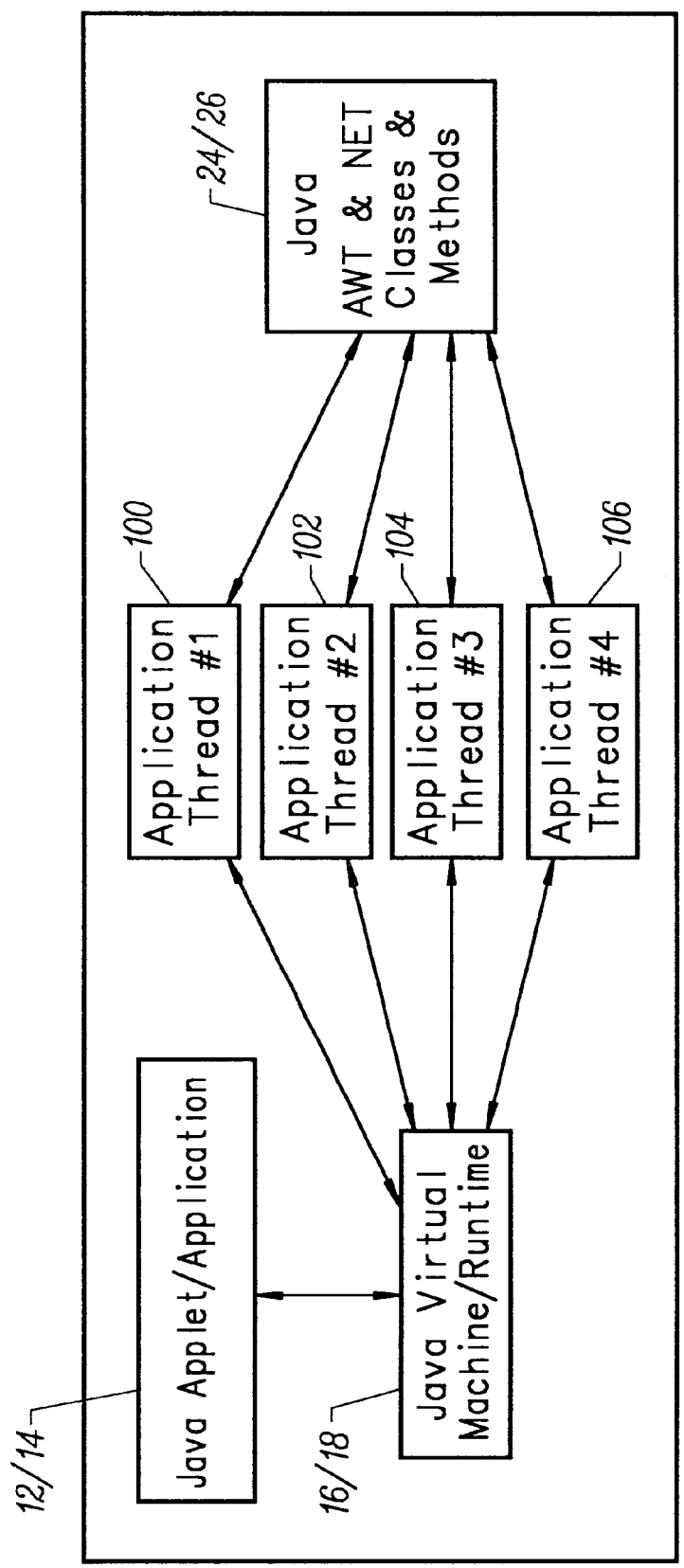
FIG. 8 is a block diagram showing a JVM using several threads "simultaneously" all using the invention.

FIG. 8 is a block diagram showing multithreaded operation of a Java Virtual Machine/Runtime, according to the invention. Because Java has a multithreaded architecture, a Java Applet 12 or application 14 that is run on the Java Virtual machine 16 and Java runtime 18 can be formed of multiple threads 100, 102, 104, 106, executing simultaneously.

A thread that contains a class or method of one of the supported Java application frameworks is directed to the invention through the hardware object management system. Thus, in the preferred embodiment of the invention, the hardware object management system manages the Java.AWT 26 and Java.NET 24 requests of threads running on the Java virtual machine. Therefore, while the hardware object management system manages the Java.AWT and Java.NET requests, the CPU is able to continue processing threads and instructions that are not dependent thereon.

Figure 9:
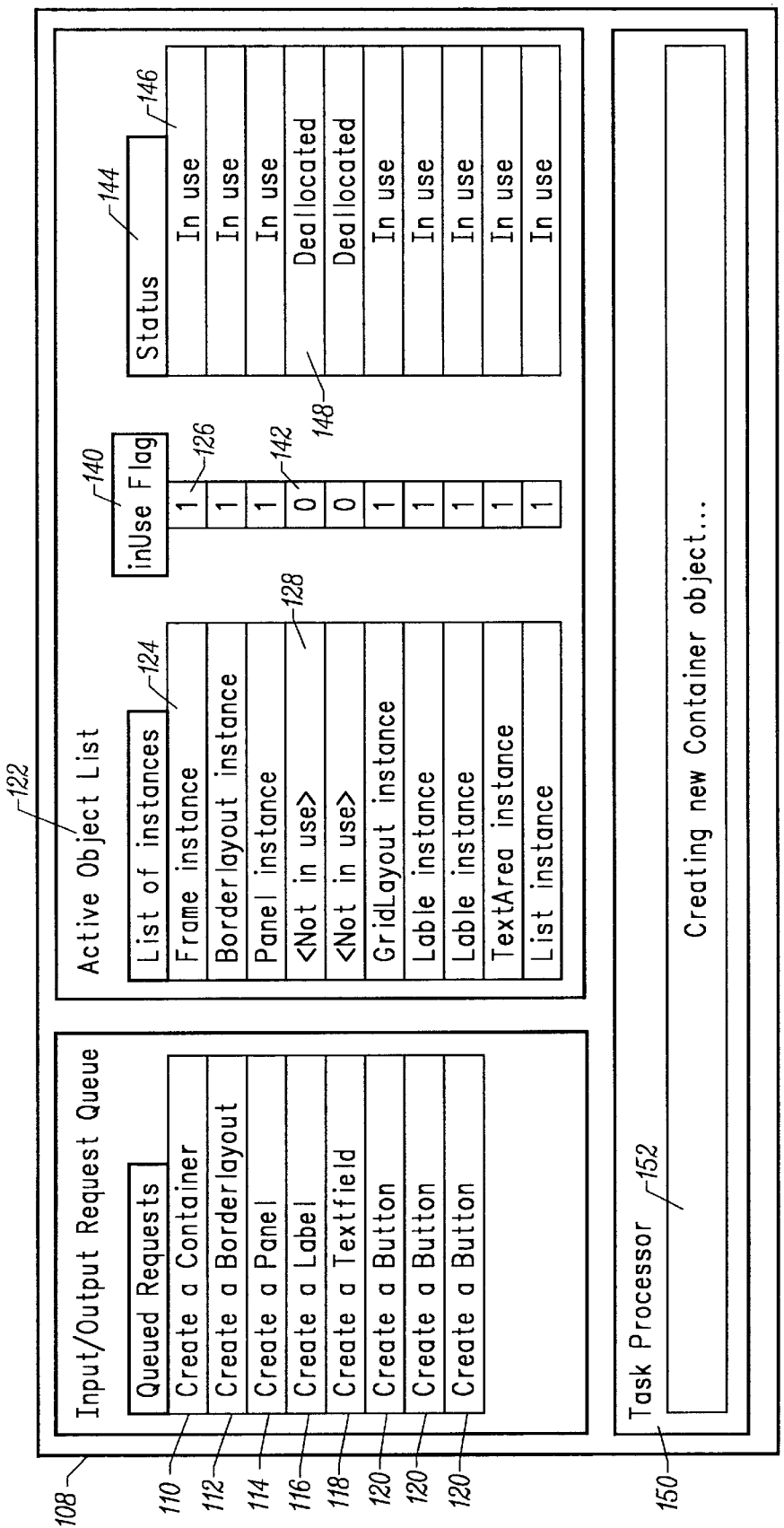
FIG. 9 is a diagram of a hypothetical session where AWT display objects are handled in hardware according to the invention.

FIG. 9 is a diagram of the hardware object management system, according to the invention. The invention manages Java.AWT and Java.NET requests as they are made by threads running on the Java virtual machine. Objects are allocated and deallocated in dedicated buffers.

The hardware object management system includes an Input/Output request queue 108 for receiving and storing object requests. Such requests can include;

create a container 110;

create a borderlayout 112;

create a panel 114;

create a label 116;

create a textfield 118; and create a button 120.

When a task processor 150 allocates memory to an object, for example, by creating a new container object 152, the object is removed from the queue. An active object list 122 stores a list of instances 124. In-use flags 140 are provided to indicate the number of reference counts 126 in the Java virtual machine to an instance.

When the number of reference counts to an instance is zero 142, the memory storing the object is deallocated by a Java garbage collector (not shown). The active object list will also indicate that the particular instance is not in use 128.

The status of an object is stored in a status listing 144. The status can include indicating that the object is in use 146, or that the memory storing the object has been deallocated 148.

Figure 10A:
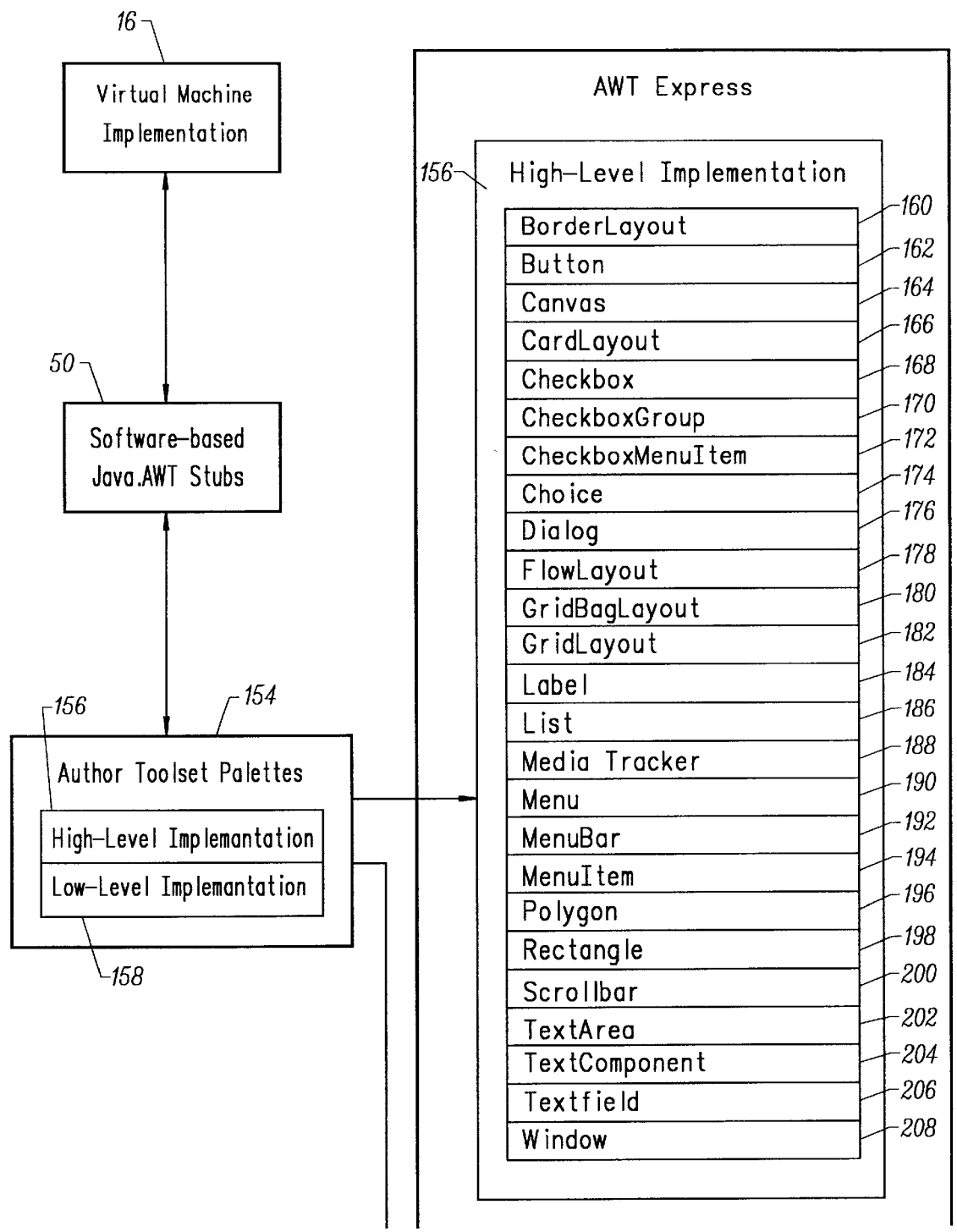
FIG. 10 is a block diagram showing the Java Abstract Windowing Toolkit objects supported by the invention.
Figure 10B:
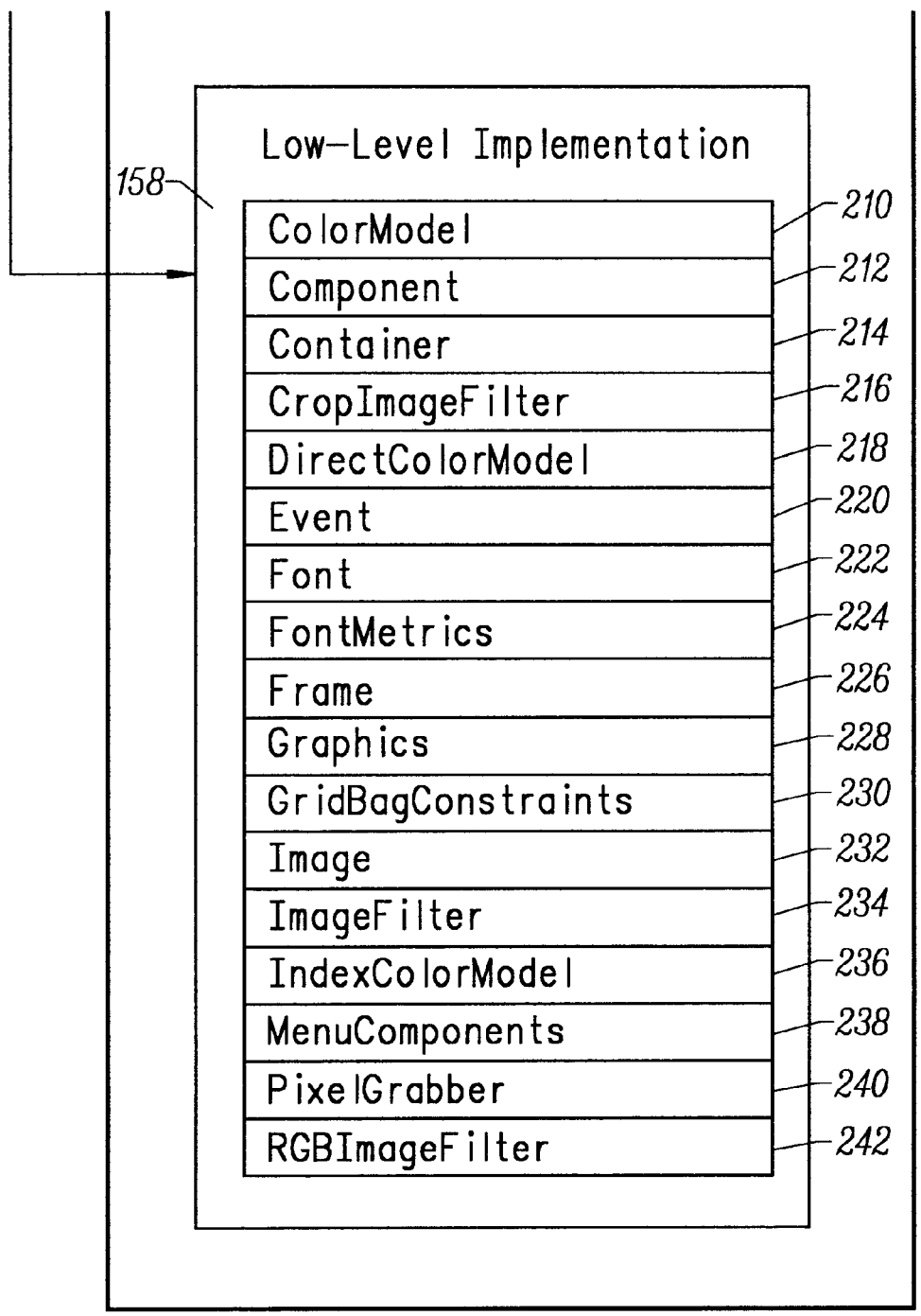

FIG. 10 is a block diagram showing the Java Abstract Windowing Toolkit objects supported by the invention. The AWTExpress framework interfaces to the software-based Java.AWT stubs. The AWTExpress framework 154 itself can be split into two parts. The "Low-Level Implementation is necessary to convert essential Java commands to our display and allow control of mouse/pen/keyboard events as well as update window and view hierarchies. The High-Level Implementation essentially adds features for the remainder of AWT, incorporating such features as macro-ized painting for UI elements (Buttons, TextAreas and Textfields).

The Java virtual machine sends data to, and receives data from the invention using a set of commands (tasks) 156, 158. The Java programming language relies primarily on low-level objects. Therefore, the low-level register 158 includes objects that are essential to Java implementation.

In one embodiment of the invention, only the low-level implementation is implemented. This embodiment has greatly reduced size and memory requirements, and is of advantage for use in embedded systems.

Low-level functionality includes elementary windowing control, image rendering, font control, and event handling. Low-level objects supported by the preferred embodiment of the invention include:

ColorModel 210;

Component 212;

Container 214;

CropImageFilter 216;

DirectColorModel 218;

Event 220;

Font 222;

FontMetrics 224;

Frame 226;

Graphics 228;

GridBagConstraints 230;

Image 232;

ImageFilter 234;

IndexColorModel 236;

MenuComponent 238;

PixelGrabber 240; and

RGBImageFilter 242.

The high-level register 156 provides secondary functionality that can be optionally implemented in hardware. Such high-level functionality includes standard GUI widgets, GUI layout behavior, and media control objects. High-level objects supported by the preferred embodiment of the invention include:

BorderLayer 160;

Button 162;

Canvas 164;

CardLayout 166;
Checkbox 168;
CheckboxGroup 170;
CheckboxMenuItem 172;
Choice 174;
Dialog 176;
FlowLayout 178;
GridBagLayout 180;
GridLayout 182;
Label 184;
List 186;
MediaTracker 188;
Menu 190;
MenuBar 192;
MenuItem 194;
Polygon 196;
Rectangle 198;
Scrollbar 200;
TextArea 202;
TextComponent 204;
Textfield 206; and
Window 208.

Because the invention represents entire application frameworks in hardware, the invention eliminates the need for a significant amount of code. For example, some parts of an OOP application framework can be made available for use by a custom application, while other parts are hidden for exclusive use by the application framework. However, in a hardware implementation, it is not necessary to hide such framework parts. It is more useful to eliminate redundant coding and to implement only those functions that are publicly accessible to software stubs that activate tasks within the hardware gate arrays.

Thus, many objects and classes of Java application frameworks care eliminated in the invention. An example of an eliminated class is the Sun Microsystems, Inc. Java.NET-.SocketInputStream class. This class inherits from Java.IO-.FileInputStream and adds only a minimal amount of functionality to the original baseclass. Thus, the invention can eliminate such a redundant class without causing a significant loss of functionality.

Figure 11:
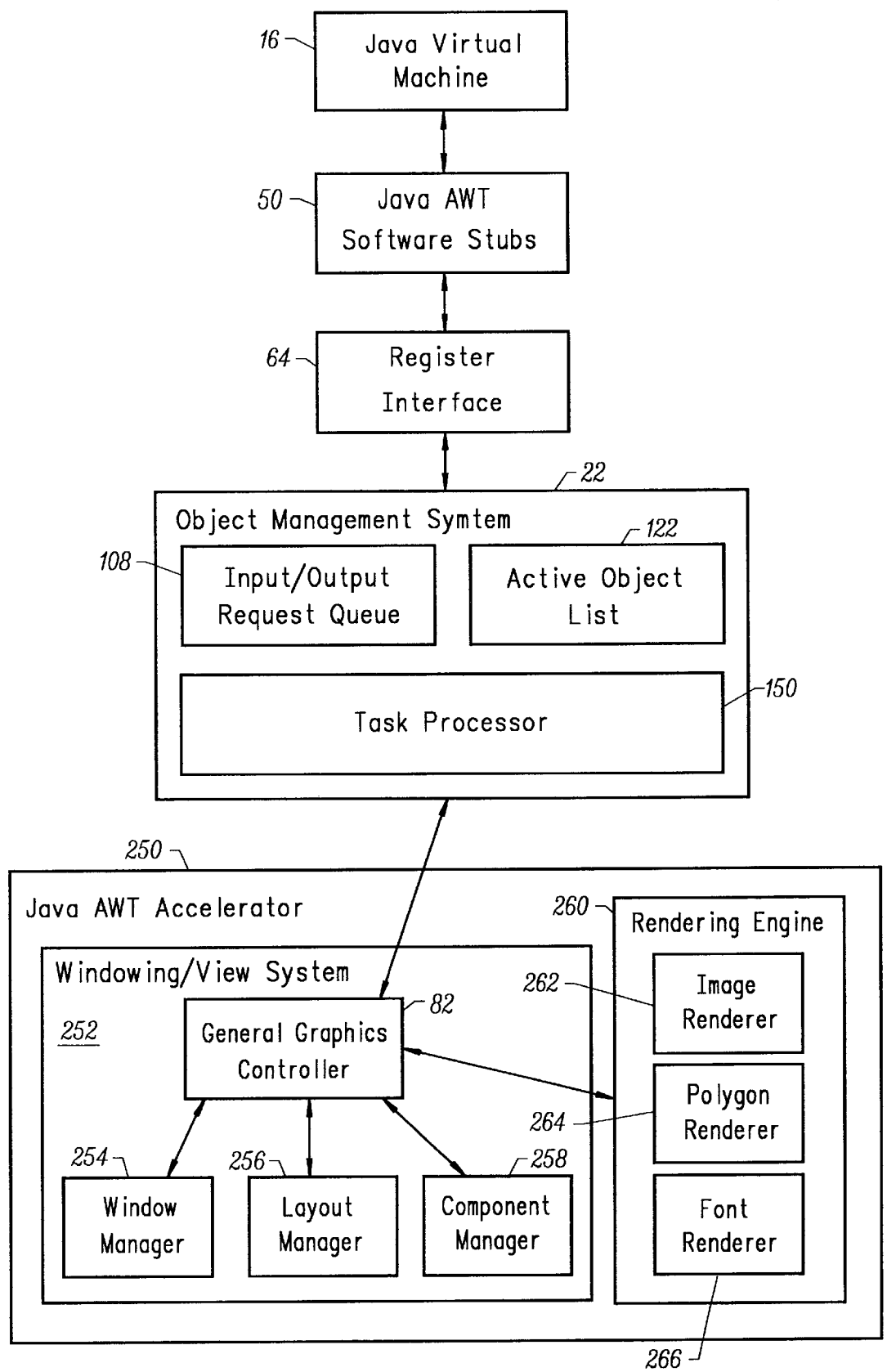
FIG. 11 is a functional block diagram of the Java Abstract Windowing Toolkit hardware implementation according to the invention.

FIG. 11 is a functional block diagram of the Java Abstract Windowing Toolkit hardware implementation according to the invention. A thread that includes instances and methods of the Java.AWT application framework is offloaded from the Java virtual machine 16 and through the Java.AWT software stubs 50 to the hardware object management system 22. The register interface 64 supervises and synchronizes all of the input and output transfers between the host CPU 62 and the hardware object management system.

Object requests are received and stored pending processing in the Input/Output request queue 108. The task processor 150 then directs each request to a hardware AWT accelerator 250. The accelerator includes a windowing/view system 252 and a rendering engine 260.

The windowing/view system includes a window manager 254 for managing frames that are generated by the invention. The layout manager 256 manages the hierarchies of containers within each frame, while the component manager 258 manages the components within each container.

The windowing/view system also includes a general graphics controller 82 for creating frames and components and for passing data to the rendering engine. The microcode for the hardware equivalencies of the Java.AWT application framework is implemented in the general graphics controller. Object/method requests are made and are executed appropriately by the other components of the windowing/view system and by the rendering engine.

The rendering engine 260 creates the requested objects, using rendering tools such as an image renderer 262, a polygon renderer 264, and a font renderer 266. One skilled in the art will readily appreciate that the types of rendering tools included with the rendering engine can be varied according to the particular requirements of the supported application framework.

The image renderer 262 receives and decompresses image data. The image is then rendered within a given component of a display. The polygon renderer 264 provides acceleration for rendering vector-based images. Predefined drawing types, such as for drawing arcs, lines, ovals, polygons, and rectangles can be supported. The font renderer 266 manages requests for displaying text.

The Window Server and Object Execution

The Window Server/Windowing System (see FIG. 12) exists at the furthest point away from the Java Virtual Machine. Relying on commands forwarded onto it from the Object Execution Mechanism (i.e. the runtime), it never directly receives commands from the software layer. As such, the Window server has no direct interface from the software level.

This is roughly equivalent to the way that Java operates on a PC. Typically, peer objects are created to map requests from the Java processor to compiled resources outside the runtime. For Windows '95/NT™ or any other modern OS this means making calls to the standard windowing system either C or Assembly code.

The compiled code used in these operating systems thus generates the primitives necessary to perform system level windowing requests. Windows are managed on a screen and standard buttons, sliders and other OS-based UI widgets are often utilized to simplify coding, increase performance and provide a user interface that matches that of the host OS itself. In Sun's JDK this is called using a peer interface, employing a set of software-based class stubs which map functionality between Java objects and compiled native code.

The invention loosely uses the ideas of peers. However, the peer implementation is provided totally at a gate-level implementation and is only accessible from other ASIC-based functionality (i.e. hard-coded Java objects). Doing this makes sense from a number of perspectives. First, peer-based drawing types can be swapped out easily at the register-definition level allowing custom or multiple UI implementations to be created. Secondly, peers in ASICS can be compartmentalized appropriately into different sections of hardware as is appropriate. That is a difference between hardware and software. In software you build logical functional groupings while in ASICs you build for efficiency and reduced gatecount.

In software we can group object-based functionality logically in a way that is orderly. All of the view-based objects can pretty much go in one place . . . one framework. In hardware it is necessary to split things up. One could build an object representation at the Window server for every UI object. However it turns out this is neither efficient nor necessary.

Figure 12:
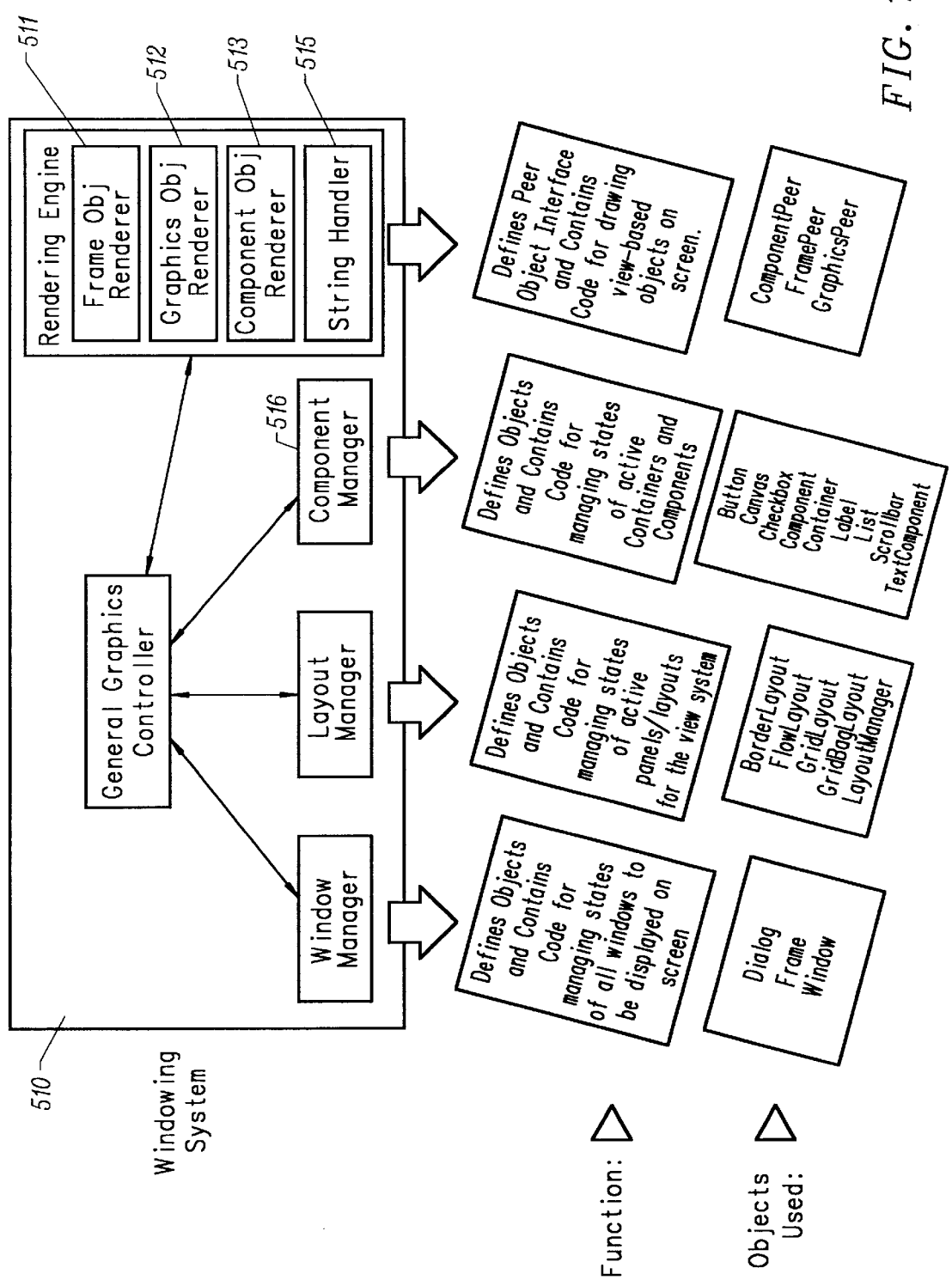
FIG. 12 is a block diagram of a windowing system according to the invention.

Necessity dictates that, if possible, elegance should be sacrificed for minimum gatecount, making the scenario in FIG. 12 a more attractive design.

Note that in this implementation of the Windowing System there are only a few objects that might be comparable to standard Java 'peer' objects. They are quite different than peers in a software-only Java implementation because they support a more abstracted set of functionalities. A software implementation might assign a peer to every UI object (i.e. Button, Slider, TextComponent, etc) whereas the invention employs a single Component peer that handles all Component-related drawing requests.

How The Rendering Engine Operates

The rendering engine 511 then encapsulates all of the actual drawing code and provides renderers/handlers for of interpreting Frame 512, Graphics 513, Component 514 and String 515 instances. The rendering engine typically accessed these instances by either memory reference or via a fixed size stream of data (30 bytes). The instance contains a command byte, instructing the rendering engine which method to execute with regard to the object.

When the rendering engine receives an instance, it first decodes the type of object that is being sent into one of the four objects supported. Once the object type is known the reference is passed down to the decoder for that particular object type. The execution method (e.g. Component:paint( )) is determined and the method executed.

Rendering Component Instances

For a Component:paint( ), the object is further queried to find out the type of component to be displayed. Currently the component section of the rendering engine knows how to render the types of view-based widgets shown on FIG. 13.

Once the rendering engine is aware of the type of component it is to draw, the instance is queried for information such as the location of and dimensions of the widget. The component is then rendered on the display.

Because objects are quite small, it is impossible to transmit strings within component instances. It is the case that the fixed size of an instance in the invention may be 30 bytes, which could be smaller than the size of a string itself. For this reason, strings or at least references to strings are sent previous to sending actual components to the rendering engine.

Strings are accumulated by the rendering engine. Either a stream or a reference to a fixed byte object containing string information is typically sent to the rendering engine. This string may be followed by another fixed block which contains another string. Subsequent transmissions are concatenated onto the end of a string until a component instance arrives. Once the component arrives, the accumulated string is associated with it and the component is then rendered with its string. The concatenation is necessary especially in the case of a textfield which may have very large strings.

Figure 14:
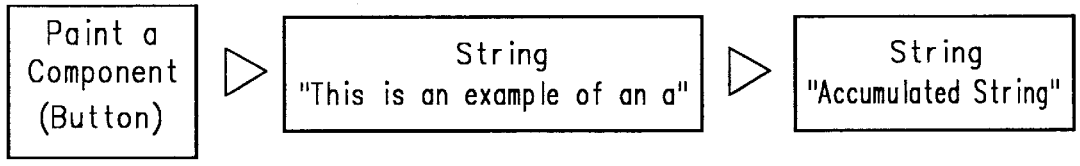
FIG. 14 is a schematic diagram showing an example of a concatenation process according to the invention.

Note that in final ASIC form the concatenation process (see FIG. 14) consists of accumulated pointers to fixed blocks containing the string to render instead a concatenated string itself. This is necessary because some components may have very large text contents, such as the TextArea which on traditional Java may be 32 kilobytes or larger. A TextArea is essentially a text editor object. Scaled down versions of the invention might have arbitrarily assign a maximum number of text characters allowed to guarantee efficient use on devices with small memory footprints.

Once the component is rendered with it's string, the string itself is set to null in preparation for the next string/component combination.

Rendering Graphics Instances

Graphics instances are different than component instances. Graphics instances, are responsible for drawing low-level primitives where components may drive this or even hundreds of primitives including lines, filled areas and text in order to draw something like an editable TextArea.

Figure 15:
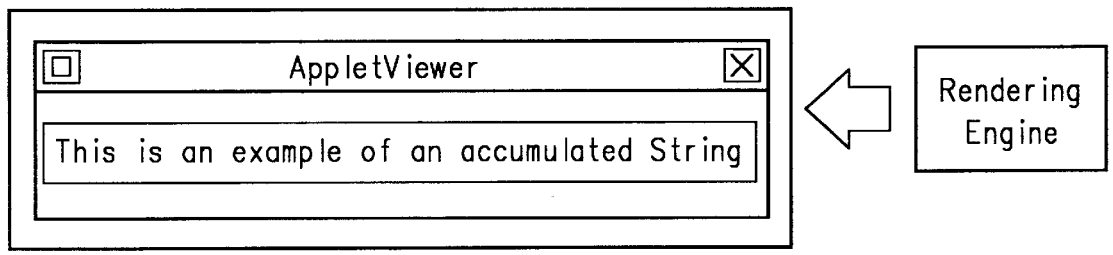
FIG. 15 is a table showing the types of rendering supported by a graphics section of the rendering engine of FIG. 13.

The graphics object supports general types of primitives drawing. The types of rendering shown on FIG. 15 are supported by the graphics object in the rendering engine.

The graphics peer implementation in the rendering engine looks fairly complicated but is actually much simpler than the component peer. Graphics supplies very low-level drawing while components usually combine a set of graphics drawing behavior into a single macro as described in the preceding paragraph.

Rendering Frame Instances

Frames are relatively straightforward in terms of what they do. This being a sort of frame peer implementation, it draws windows on the screen of a specific type. The window display type may change depending on the implementation and may support multiple personality types, as is the case overall with the rendering engine.

Generally a frame has a title bar, an icon image and a cursor type associated with it. Frames behave in the same way that components and graphics do, but are drawn behind the UI that they contain.

Frames are a type of container in the standard Java implementation. However, because this is something like a frame peer, it has no direct relationship with any other objects. As far as the rendering engine is concerned, a window is just a special object with a macro that draws a specific set of lines and so forth. It acts very similar to the way a component behaves at this level.

Figure 16:
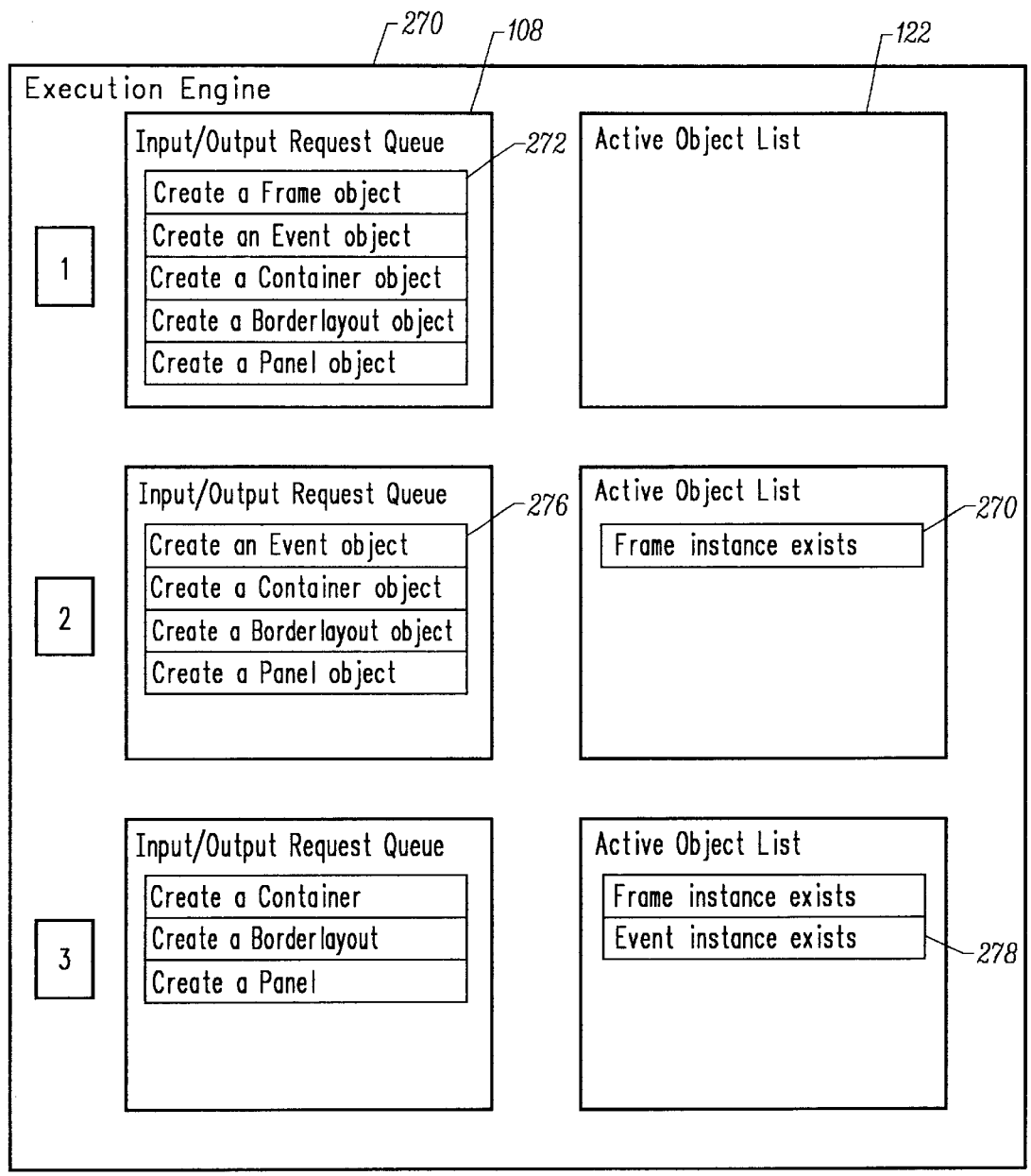
FIG. 16 is a block diagram showing Java.AWT- accelerator "instruction" execution and object management according to the invention.

FIG. 16 is a block diagram showing Java.AWT accelerator object management, according to the invention. Object requests are queued up in the execution engine's 270 input/output request queue 108 pending processing. As an object becomes active, it is added to the active object list 122.

In FIG. 16, the first object request in the input/output request queue is to create a frame object 272. When the frame object is created, it is added 274 to the active object list. The next object request, to create an event object 276, is then moved to the top of the input/output request queue. When the event object is created, it is also added 278 to the active object list.

An object remains active until the objects Java Virtual Machine garbage collector reference count decreases to zero. (See FIG. 9, above). Additionally, objects can contain references to each other, as necessary. For example, the relationships among a window, a button within the window, and text displayed on the button are indicated by such references.

Figure 17:
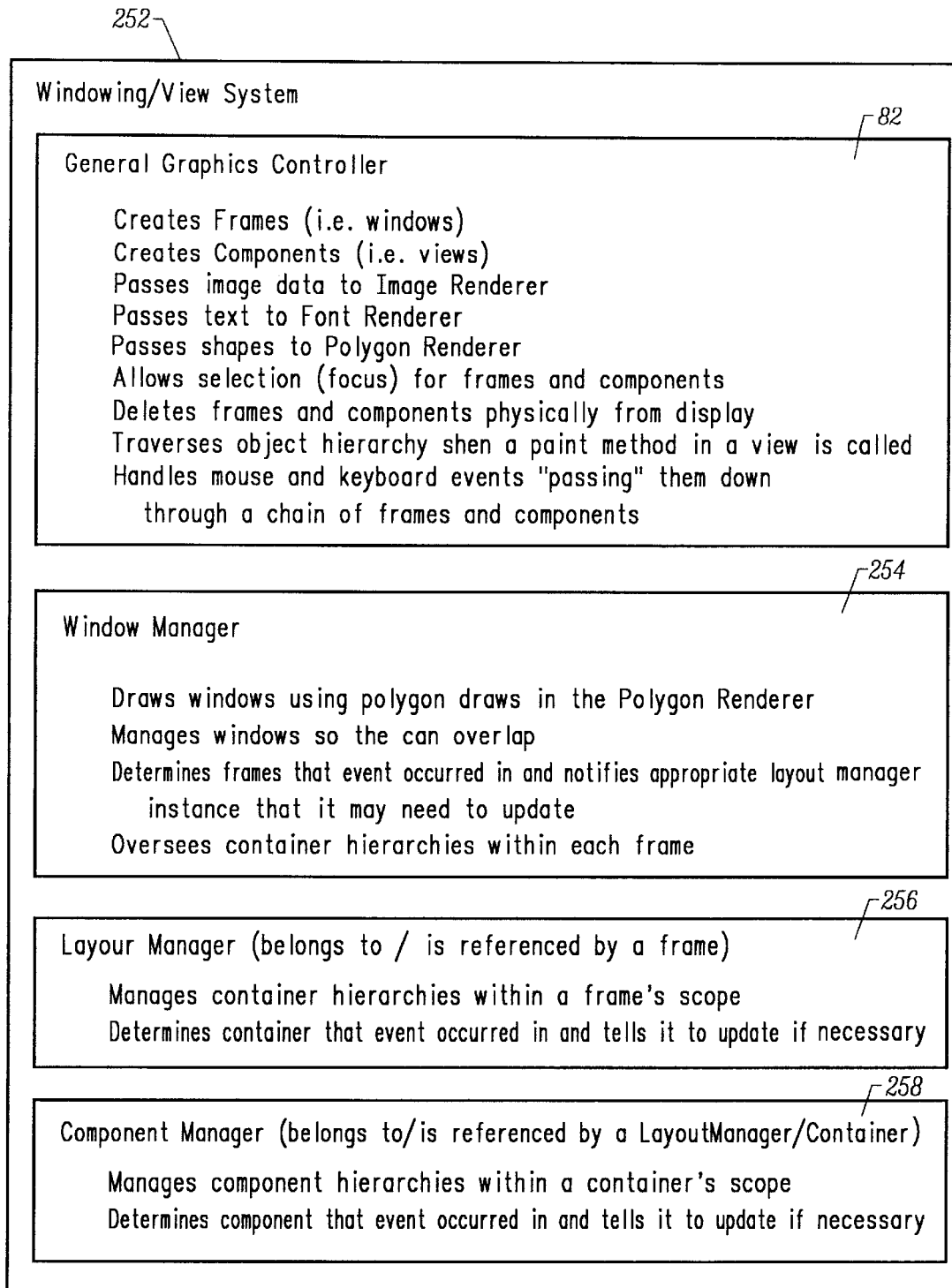
FIG. 17 is a description of functionalities embedded in the AWT section according to the invention.

FIG. 17 is a description of functionality within a Java.AWT accelerator Window/View system 252, according to the invention. The microcode for the hardware equivalencies of the Java.AWT application framework is implemented in the general graphics controller 82. In the preferred embodiment of the invention, the functions performed by the general graphics controller include:

Creating Frames (i.e. windows);

Creating Components (i.e. views);

Passing image data to the Image Renderer;

Passing text to the Font Renderer;

Passing shapes to the Polygon Renderer;

Allowing selection (focus) for frames and components;

Deleting frames and components physically from a display;

Traversing object hierarchy when a paint method in a view is called; and

Handling mouse and keyboard events by "passing" them down through a chain of frames and components.

The functions performed by the window manager 254 include:

Drawing windows using polygon draws in the Polygon Renderer;

Managing windows so they can overlap;

Determining the frame that an event occurred in and notifying the appropriate layout manager instance that it may need to update; and Overseeing container hierarchies within each frame.

The windowing/view system also includes a layout manager 256 and a component manager 258. The layout manager belongs to (is referenced by) a frame, and performs the functions of:

Managing container hierarchies within a frame's scope: and

Determining the container that an event occurred in and directing the container to update, if necessary.

The functions performed by the component manager include:

Managing component hierarchies within a container's scope: and

Determining the component that an event occurred in and directing the component to update, if necessary.

Figure 18:
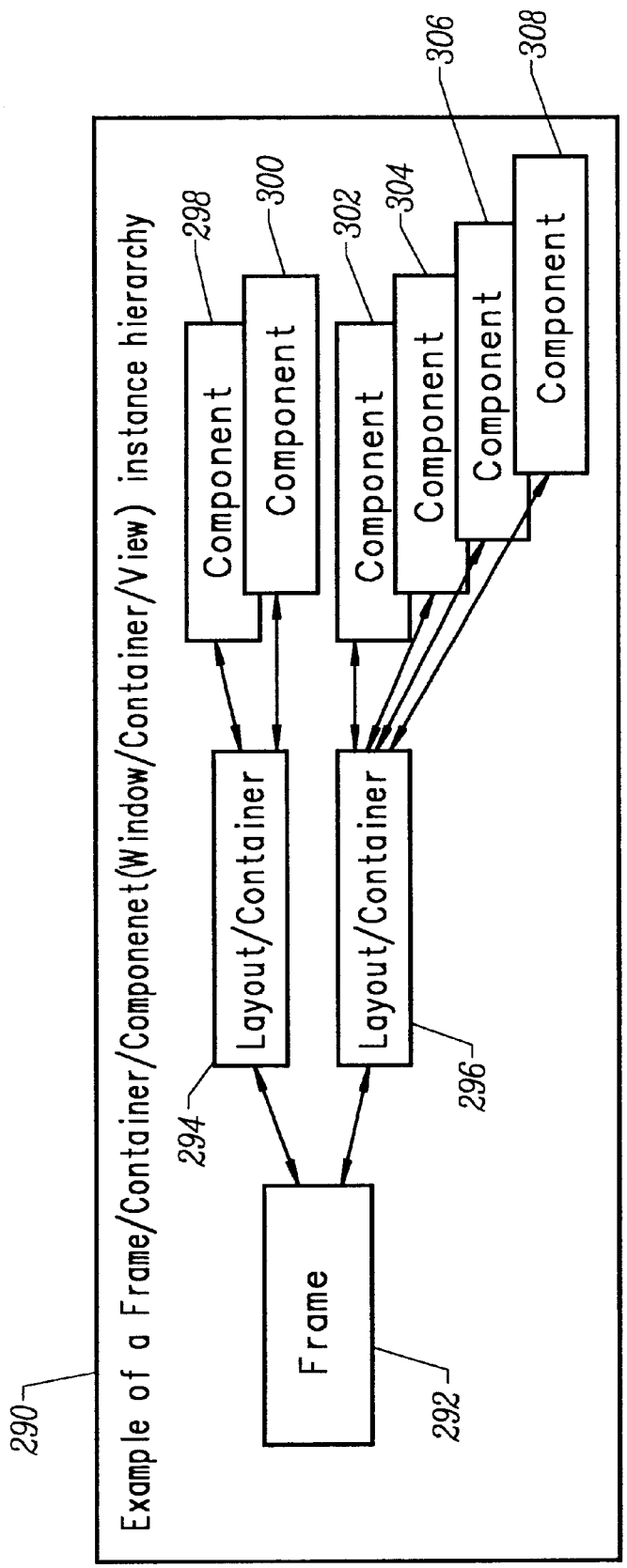
FIG. 18 is a block diagram of an example of a Java Abstract Windowing Toolkit Window/Container/View instance hierarchy according to the invention.

FIG. 18 is a block diagram of an example of a Java Abstract Windowing Toolkit Window/Container/View instance hierarchy 290, according to the invention. A frame 292 can contain one or more containers 294, 296. Each container, in turn, can contain one or more components, of varying types.

Figure 19:
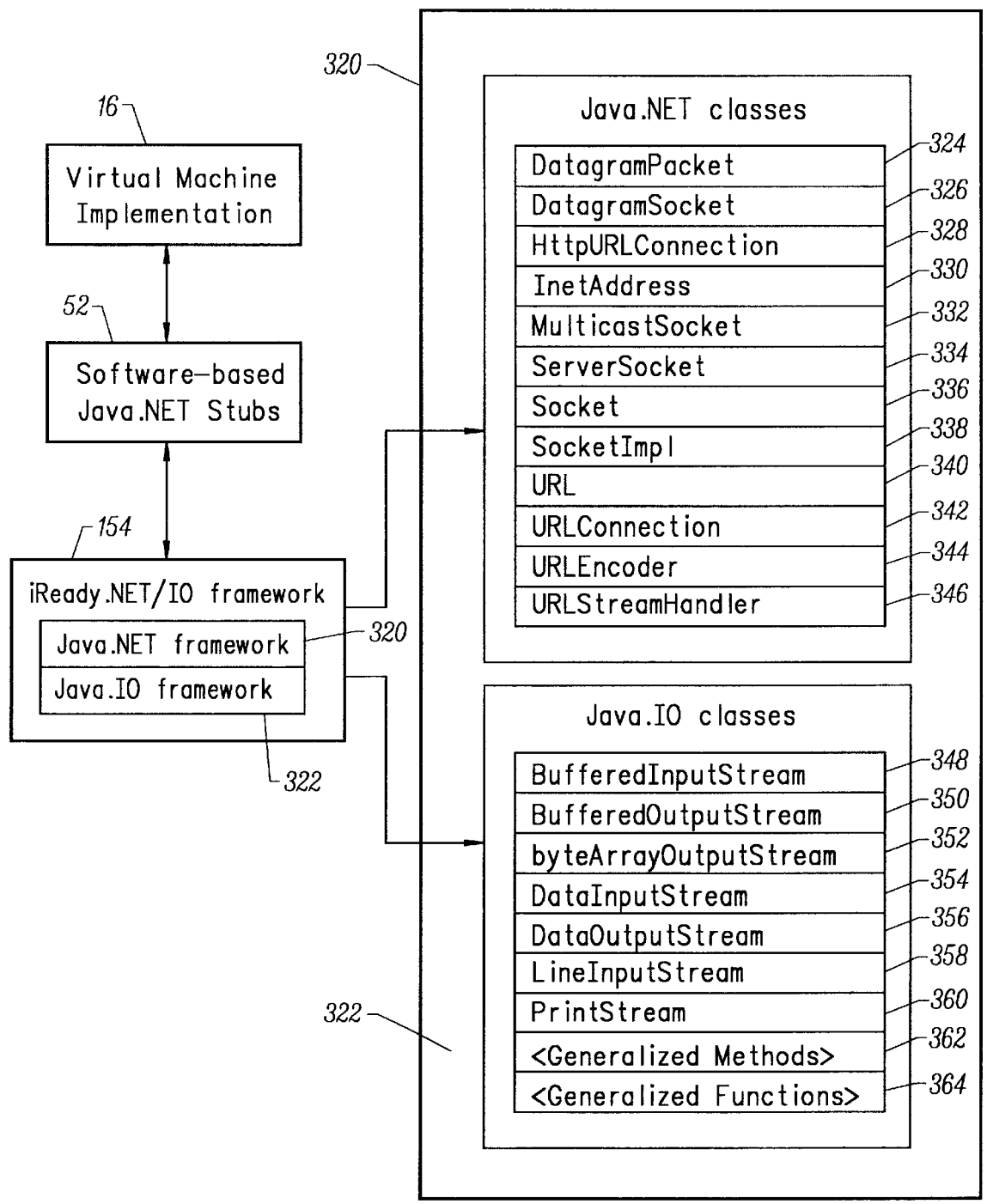
FIG. 19 is a block diagram of the Java.Net objects supported by the invention.

FIG. 19 is a block diagram of the Java.NET objects supported by the invention. Authoring tools can be provided to permit a user to create Java.NET and Java.IO framework objects and methods by assembling preexisting components from the :Ready.NET/IO framework 154.

Java.NET classes 320 supported in the preferred embodiment of the invention include:

DatagramPacket 324;

DatagramSocket 326;

HttpURLConnection 328;

InetAddress 330;

MulticastSocket 332;

ServerSocket 334;

Socket 336;

SocketImpl 338;

URL 340;

URLConnection 342;

URLEncoder 344; and

URLStreamHandler 326.

Java.IO classes 322 supported in the preferred embodiment of the invention include:

BufferedInputStream 348;

BufferedOutputStream 350;

ByteArrayOutputStream 352;

DataInputStream 354;

DataOutputStream 356;

LineInputStream 358;

360;

<Generalized Methods> 362; and

<Generalized Functionalities> 364.

Many redundant support objects are eliminated in the Java.NET accelerator without causing any loss of networking functionality.

Figure 20:
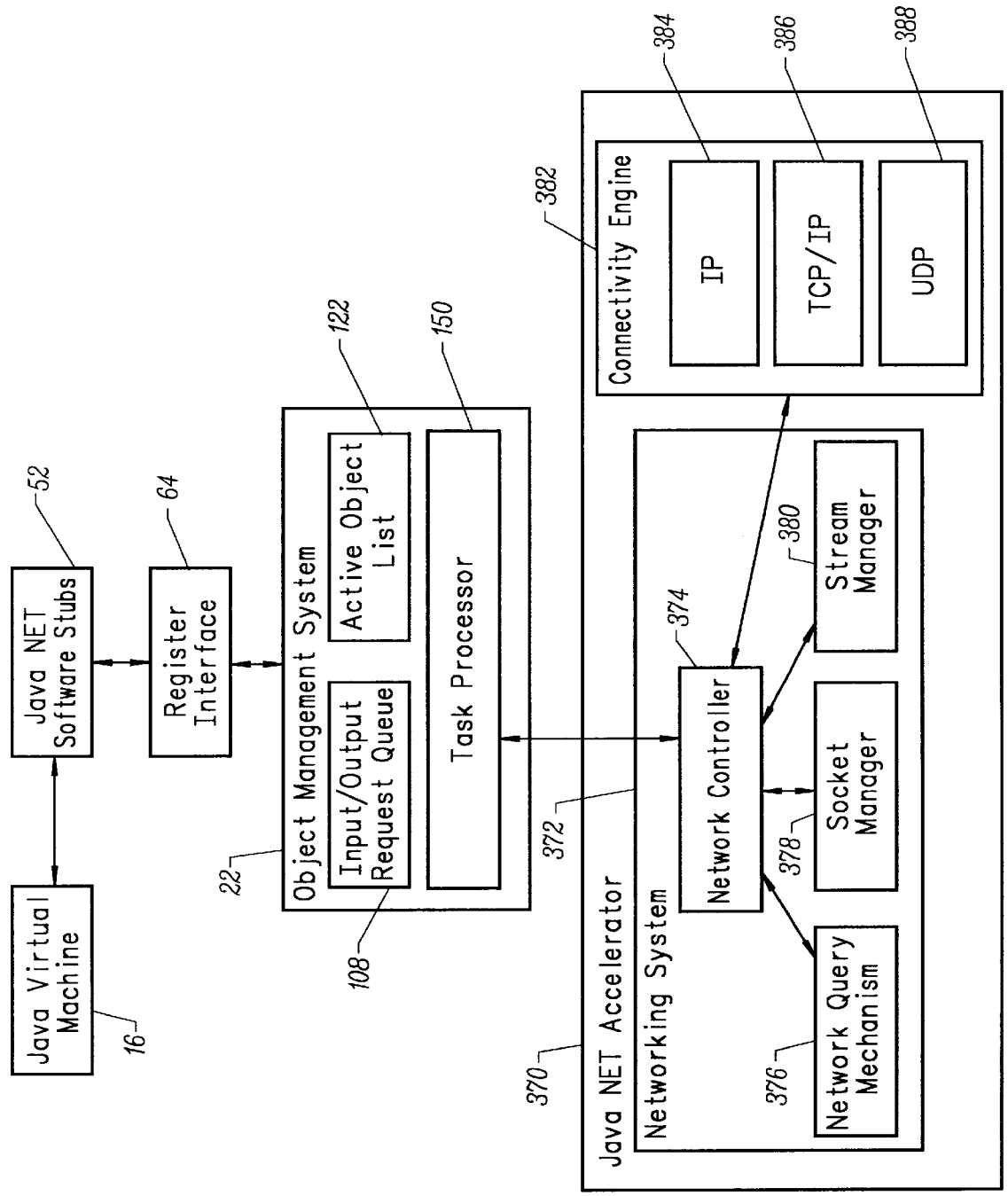
FIG. 20 is a functional block diagram of the Java.Net accelerator according to the invention.

FIG. 20 is a functional block diagram of the Java.NET accelerator according to the invention. A thread that includes instances and methods of the Java.NET application framework is offloaded from the Java virtual machine 16 and through the Java.NET software stubs 52 to the hardware object management system 22. The register interface 64 supervises and synchronizes all of the input and output transfers between the host CPU 62 and the hardware object management system.

Java.NET object requests are received and stored pending processing in the Input/Output request queue 108. The task processor 150 then directs each request to a hardware NET accelerator 370. The accelerator includes a networking system 372 and a connectivity engine 382. The connectivity engine executes a request to establish, maintain, or terminate a network connection, for example, using such network protocols as IP 384, TCP/IP 386, and UDP 388.

Microcode for the Java.NET accelerator is implemented in the Network Controller 374. The windowing/view system also includes a network query mechanism 376, a socket manager 378, and a stream manager 380.

Figure 21:
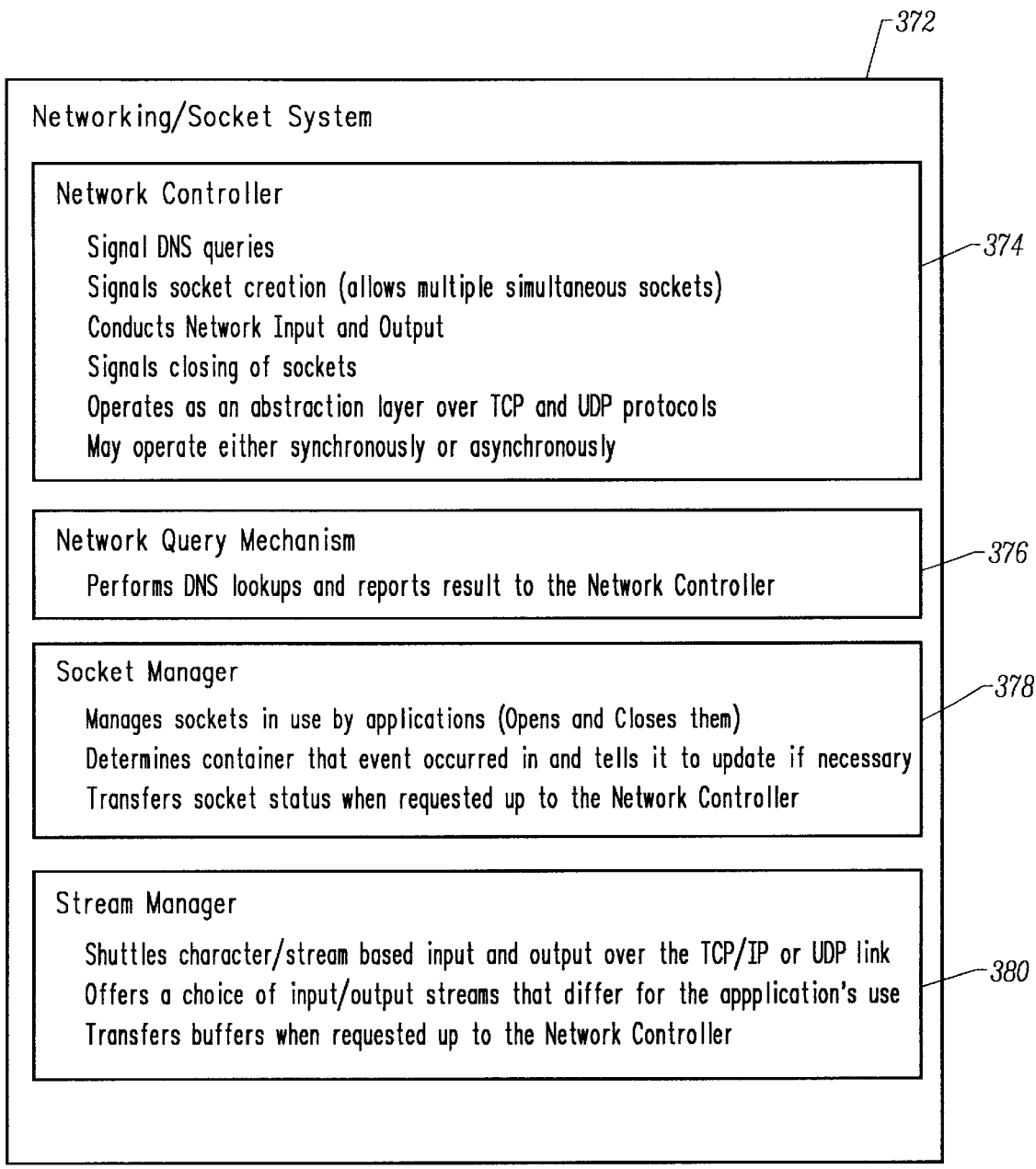
FIG. 21 is a description of functionalities embedded in the NET section according to the invention

FIG. 21 is a description of functionality within the Java.NET accelerator windowing/view system 372, according to the invention. The functions of the network controller 374 include:

signalling DNS queries;

signalling socket creation, allowing multiple simultaneous sockets;

conducting network input and output;

signalling closing of sockets; and operating as an abstraction layer over TCP and UDP protocols.

The network controller can operate either synchronously or asynchronously. The network query mechanism 376 performs DNS lookups and reports the results to the network controller.

The socket manager 378 manages sockets that are in use by applications. This management includes opening and closing the socket connections. The socket manager also determines the container that an event occurred in and notifies the container to update, if necessary. When requested, socket status is transferred to the network controller.

The stream manager 380 shuttles character/stream based input and output over the TCP/IP or UDP link. The stream manager offers a choice of input/output streams that differ for an application's use. Additionally, when requested, the stream manager transfers buffers to the network controller.

Although the invention is described herein with reference to the preferred embodiment, one skilled in the art will readily appreciate that other applications may be substituted for those set forth herein without departing from the spirit and scope of the present invention.

For example, in the preferred embodiment of the invention, only one hardware object management system is required on the ASIC for any number of supported application frameworks. However, in alternative embodiments, multiple hardware object management systems are provided. For example, a separate hardware component, such as an ASIC, can be provided for each supported application framework, with each hardware component having a dedicated hardware object management system.

The invention can be formed as a part of a computer system, or can be formed as a part of an insertable device, such as a PCI card.

One skilled in the art will readily be able to construct the hardware and software required for the invention using well-known programming techniques and equipment.

Appendices A–L, attached hereto and incorporated as a part of this application, further describe the features, functions, and structure of the invention.

Appendix A is a logic description according to one embodiment of the invention. Appendix A details an example of the objects, parameter lists and local variables that presently need to be implemented for the invention to be Java.NET compliant. Appendix A is a list of objects, methods, and variables that have been used to build one embodiment of the invention. References to "dependencies" in Appendix A denote the objects upon which the said object is dependent. Similarly, references to "Exceptions" are Exception classes upon which the said object is dependent.

Appendix B is a list of the Register Set for the Java.NET accelerator, according to one embodiment of the invention. The processor sends data to, and retrieves data from, the invention using this Register Set.

Appendix C is an exemplary High-Level Command Set for the Java.NET accelerator according to one embodiment of the invention. This High-Level Command Set provides object-based functionality in hardware that allows the Java.NET codebase to be consolidated into silicon.

Appendix D is an exemplary list of an Low-Level System Service Interface/Description for the Java.NET accelerator according to one embodiment of the invention.

Appendix E is an exemplary list of method equivalencies for the High-Level System Services of the Java.NET accelerator according to one embodiment of the invention.

Appendix F is an exemplary list of Java.IO method equivalencies for the High-Level System Services of the Java.NET accelerator according to one embodiment of the invention.

Appendix G is an exemplary list of General OutputStream, Stream-based Object, and Object method equivalencies for the Java.NET accelerator according to one embodiment of the invention.

Appendix H is an exemplary list of codes used for Exception Errors in the Java.NET accelerator according to one embodiment of the invention. Many operations, including function calls in the invention, or Java.NET method calls, can result in exception errors. This is because requests related to sending and receiving data over socket connections can fail for a variety of reasons. Several types of exception errors can occur within the Java.NET and Java.IO application frameworks. The invention can support these exception errors by making return values available to the software layer that exists on top of the hardware component. Thus, error checking and handling can take place.

Appendix I is an example of a Low-Level Implementation API for the Java.AWT accelerator according to one embodiment of the invention.

Appendix J is an example of a High-Level Implementation API for the Java.AWT accelerator according to one embodiment of the invention.

Appendix K is an exemplary explanation of the Object-oriented Java.AWT accelerator according to one embodiment of the invention.

Appendix L is an example of a silicon architecture according to one embodiment of the invention.

Accordingly the invention should only be limited by the claims included below.

What is claimed is:

1. An apparatus for accelerating a processor running an object-oriented programming language, comprising:

a hardware accelerator interfaced with said processor for implementing at least one application framework of said object-oriented programming language, wherein said at least one application framework comprises a set of classes further comprising:

an Input/Output request queue interacting with said processor for receiving and sequentially storing said instructions pending execution of each instruction;

a task processor for processing said instructions from said Input/Output request queue; and an active object list for tracking the number of reference counts to an instance and for deallocating an instance that is not in use based upon a result of said task processor processing said instructions;

a hardware object management system interacting with said hardware accelerator for managing instances of said application framework and the states of values assigned to said instances based upon said hardware object management system interacting with said hardware accelerator circuit; and a software stub that controls interfacing of said hardware accelerator with said processor.

2. The apparatus of claim 1, wherein said object-oriented programming language is Java.

3. The apparatus of claim 1, wherein said hardware accelerator further comprises a Java.AWT circuit interacting with said task processor to implement the Java.AWT application framework through interactions with said task processor.

4. The apparatus of claim 3, wherein said Java.AWT circuit is further comprised of a windowing/view system communicating with said task processor and interacting with a rendering engine.

5. The apparatus of claim 4, wherein said windowing/view system comprises:

a general graphics controller communicating with said task processor and interacting with said rendering engine for creating frames and components and for passing data to said rendering engine;

a window manager communicating with said general graphics controller for managing said frames;

a layout manager communicating with said general graphics controller for managing container hierarchies within said frame; and a component manager communicating with said general graphics controller for managing component hierarchies within said container.

6. The apparatus of claim 1, wherein said hardware accelerator implements the Java.NET and Java.IO application frameworks.

7. The apparatus of claim 6, further comprising:

a windowing/view system communicating with said task processor and interacting with a connectivity engine.

8. The apparatus of claim 7, wherein said windowing/view system comprises:

a network controller responsive to said hardware object management system, said network controller executes microcode to implement Java.NET framework equivalencies, wherein said network controller operates as an abstraction layer over protocols supported by said connectivity engine through interactions between said network controller and said connectivity engine;

a network query mechanism for performing DNS lookups and for reporting results to said network controller through said network query mechanism interacting with said network controller;

a socket manager for managing sockets in use by applications through interactions between said socket manager and said network controller; and a stream manager for shuttling input and output data through a link supported by said protocols by interactions between said stream manager and said network controller.

9. The apparatus of claim 1, wherein said hardware accelerator is formed as a part of an application specific integrated circuit.

10. The apparatus of claim 1, wherein said object-oriented programming language is C++.

11. A method for accelerating a processor running an object-oriented programming language, comprising the steps of:

implementing at least one application framework of said object-oriented programming language with a hardware accelerator interfaced with said processor, wherein said at least one application framework comprises a set of classes that embodies an abstract design for solutions to a number of related problems; and controlling said interface between said hardware accelerator circuit and said processor with a software stub;

wherein said hardware accelerator is further comprised of a Java.NET circuit to implement the Java.NET and Java.IO application frameworks;

wherein said method is further comprised of the steps of:
creating and displaying windows and views with a windowing/view system;

managing a network connection using a connectivity engine in said Java.NET circuit;

providing a network controller in said Java.NET circuit responsive to said hardware object management system, said network controller executing microcode to implement Java.NET framework equivalencies, wherein said network controller operates as an abstraction layer over protocols supported by said connectivity engine communicating with said network controller;

providing a network query mechanism for performing DNS lookups and for reporting results to said network controller by communicating with said network controller;

managing with a socket manager sockets in use by said application through said socket manager communicating with said network controller; and shuttling with a stream manager communicating with said network controller input and output data through a link supported by said protocols.

12. An apparatus for accelerating a processor running the Java programming language, comprising:

a hardware accelerator for implementing at least one Java application framework, wherein said at least one Java application framework comprises a set of classes that embodies an abstract design for solutions to a number of related problems;

a hardware object management system communicatively interfaced with said processor for managing instances of application framework and the states of values assigned to said instances, said hardware object management system comprising an Input/Output request queue for receiving and sequentially storing said instructions pending execution of each instruction through communication across said communication interface with said processor, a task processor for processing said instructions received from said Input/Output request queue through interaction with said hardware accelerator, and an active object list for tracking the number of reference counts to an instance and for deallocating an instance that is not in use based upon said task processor interaction with said hardware accelerator; and a software stub for control of interfacing said hardware object management system with said processor.

13. The apparatus of claim 12, wherein said hardware accelerator further comprising a Java.AWT circuit implementing the Java.AWT application framework through interactions with said hardware object management system.

14. The apparatus of claim 13, wherein said Java.AWT circuit is further comprised of a windowing/view system communicating with said hardware object management system and interacting with a rendering engine.

15. The apparatus of claim 14, wherein said windowing/view system comprises:

a general graphics controller communicating with said hardware object management system and communicating with said rendering engine for creating frames and components and for passing data to said rendering engine;

a window manager communicating with said general graphics controller for managing said frames;

a layout manager communicating with said general graphics controller for managing container hierarchies within said frame; and a component manager communicating with said general graphics controller for managing component hierarchies within said container.

16. The apparatus of claim 12, wherein said hardware accelerator further comprising a Java.NET circuit communicating with said hardware object management system implementing the Java.NET and Java.IO application frameworks through communication with said hardware object management system.

17. The apparatus of claim 16, wherein said Java.NET circuit further comprising:

a windowing/view system communicating with said task processor and communicating with a connectivity engine.

18. The apparatus of claim 17, wherein said windowing/view system comprises:

a network controller responsive to said hardware object management system, said network controller executing microcode to implement Java.NET framework equivalencies, wherein said network controller operates as an abstraction layer over protocols supported by said connectivity engine through communicating with said connectivity engine;

a network query mechanism for performing DNS lookups and for reporting results to said network controller through communicating with said network controller;

a socket manager for managing sockets in use by applications through communicating with said network controller; and a stream manager for shuttling input and output data through a link supported by said protocols through communicating with said network controller.

19. The apparatus of claim 12, wherein said hardware accelerator is formed as a part of an application specific integrated circuit.

20. A method for accelerating a processor running an object-oriented programming language, comprising the steps of:

implementing at least one application framework of said object-oriented programming language including a set of classes with a hardware accelerator interfaced with said processor is further comprised of the steps of:

receiving and sequentially storing said instructions communicated from said processor in an Input/Output request queue pending execution of each instruction;

processing said instructions from said Input/Output request queue in a task processor; and tracking the number of reference counts to an instance and deallocating an instance that is not in use with an active object list based upon interactions with a hardware object management system;

managing instances of said application framework and the states of values assigned to said instances using said hardware object management system communicating with said processor and communicating with said hardware accelerator; and controlling said interface between said hardware accelerator circuit and said processor with a software stub.

21. The method of claim 20, wherein said object oriented programming language is Java.

22. The method of claim 21, wherein said hardware accelerator further comprises a Java.AWT circuit that implements the Java.AWT application framework.

23. The method of claim 22, further comprising the steps of:

creating and displaying windows and views with a windowing/view system in said Java.AWT circuit; and drawing said windows and views on a display with a rendering engine in said Java.AWT circuit.

24. The method of claim 23, further comprising the steps of:

providing a general graphics controller in said Java.AWT circuit for creating frames and components and for passing data to said rendering engine;

providing a window manager in said Java.AWT circuit communicating with said general graphics controller for managing said frames;

providing a layout manager in said Java.AWT circuit communicating with said general graphics controller for managing container hierarchies within said frame; and providing a component manager in said Java.AWT circuit communicating with said general graphics controller for managing component hierarchies within said container.

25. The method of claim 20, wherein said hardware accelerator is formed as a part of an application specific integrated circuit.

26. The method of claim 20, wherein said object oriented programming language is C++.

* * * * *